United States Patent
Ido

(10) Patent No.: US 8,368,958 B2
(45) Date of Patent: Feb. 5, 2013

(54) APPARATUS, METHOD, AND PROGRAM PRODUCT FOR PROCESSING COLOR AND TRANSPARENT IMAGES ACCORDING TO THE SAME LAYOUT SETTING OR NOT BASED THE DETERMINED IMAGE TYPE TO OUTPUT AS ONE IMAGE

(75) Inventor: Yoko Ido, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 12/779,860

(22) Filed: May 13, 2010

(65) Prior Publication Data

US 2010/0309496 A1 Dec. 9, 2010

(30) Foreign Application Priority Data

Jun. 4, 2009 (JP) .................................. 2009-135311

(51) Int. Cl.
- *H04N 1/50* (2006.01)
- *H04N 1/56* (2006.01)
- *H04N 1/387* (2006.01)
- *G06K 15/02* (2006.01)
- *H04N 1/393* (2006.01)
- *B41M 3/10* (2006.01)

(52) U.S. Cl. ........ 358/2.1; 358/1.2; 358/3.24; 358/3.28; 358/1.18; 358/518; 358/537

(58) Field of Classification Search .................. 358/1.2, 358/1.9, 2.1, 3.24, 3.28, 1.18, 501, 518–521, 358/526–528, 530, 537, 540, 300; 382/162, 167; 283/94, 113, 114; 347/98, 107, 115; 399/39, 40, 67, 184, 223, 320, 321

See application file for complete search history.

(56) References Cited

U.S. PATENT DOCUMENTS

| | | | |
|---|---|---|---|
| 7,324,240 B2 * | 1/2008 | Ng | 358/1.9 |
| 2008/0298860 A1 * | 12/2008 | Omata | 399/321 |
| 2011/0103811 A1 * | 5/2011 | Tamaki | 399/40 |
| 2011/0116111 A1 * | 5/2011 | Harada | 358/1.9 |
| 2012/0189337 A1 * | 7/2012 | Takemura | 399/67 |

FOREIGN PATENT DOCUMENTS

JP 2001-245094 A 9/2001

\* cited by examiner

*Primary Examiner* — Scott A Rogers

(74) *Attorney, Agent, or Firm* — Canon USA Inc. IP Division

(57) ABSTRACT

An image processing apparatus includes a setting unit configured to execute a layout setting on first image data, a determination unit configured to determine an image type of second image data, an image processing unit configured, if it is determined, as a result of determination by the determination unit, that the image type of the second image data is an image type for applying a layout setting set for the first image data, to execute image processing on the second image data according to the layout setting set for the first image data, and an output unit configured to form an image of the first image data on a printing sheet by using color toners, to form an image of the second image data on the printing sheet by using a transparent toner.

19 Claims, 25 Drawing Sheets

FIG.9

| CMYK IMAGE DATA FILE NAME | sun.doc |
|---|---|
| TRANSPARENT IMAGE DATA FILE NAME | moon.doc |
| USER NAME | Yamada |
| JOB START DATE AND TIME | 2008/06/01 11:01 |

| LAYOUT SETTING | PARAMETER |
|---|---|
| ENLARGEMENT/REDUCTION | 70% |
| REVERSAL | ON |

FIG.10
SELECT TYPE OF IMAGE DATA TO BE REGISTERED...
PLEASE SELECT TYPE OF IMAGE DATA TO BE REGISTERED.
IMAGE DATA TO BE REGISTERED: | moon.doc
 WATERMARK TYPE
 CMYK IMAGE DATA-DEPENDENT TYPE
[ OK ]  [ CANCEL ]

FIG.11

SELECT TYPE OF IMAGE DATA TO BE REGISTERED...

PLEASE SELECT TYPE OF IMAGE DATA TO BE REGISTERED.

IMAGE DATA TO BE REGISTERED: moon.doc

WATERMARK TYPE

CMYK IMAGE DATA-DEPENDENT TYPE 1  2  3  4  5

OK   CANCEL

FIG.12

PRINT SETTING

PLEASE SET PRINTING METHOD.

- ☑ ENLARGEMENT/REDUCTION  70  %
- ☑ REVERSAL
- ☐ NEGATIVE/POSITIVE INVERSION
- ☐ PAGE LAYOUT           PAGES/SHEETS
- ☐ ROTATION              DEGREES

---

- ☑ PROCEED TO PRINTING OF TRANSPARENT IMAGE DATA
  NAME OF TRANSPARENT IMAGE DATA:  moon.doc

[ OK ]  [ CANCEL ]

FIG.13

START PRINTING OF TRANSPARENT IMAGE DATA

STARTING PRINTING OF THE FOLLOWING TRANSPARENT IMAGE DATA...

NAME OF TRANSPARENT IMAGE DATA: moon.doc

SET SHEET HAVING PRINTED CMYK IMAGE ON TRAY OR CASSETTE.
THEN PRESS "START".

[ OK ]  [ CANCEL ]

FIG.14

START PRINTING OF TRANSPARENT IMAGE DATA

STARTING PRINTING OF THE FOLLOWING TRANSPARENT IMAGE DATA...

SET SHEET HAVING PRINTED CMYK IMAGE ON TRAY OR CASSETTE.

NAME OF TRANSPARENT IMAGE DATA: moon.doc

■ PRINT SETTING

· ENLARGEMENT/REDUCTION: 70%

· REVERSAL

APPLY THESE SETTINGS?

| START PRINTING WITH THE SETTINGS | RESET SETTING AND START PRINTING | CANCEL |

FIG.15
| | LIST OF TWO-PASS PRINTING JOBS | | | | |
|---|---|---|---|---|---|
| | PLEASE SELECT JOB NUMBER OF JOB TO BE PRINTED. | | | | |
| No. | JOB START DATE AND TIME | USER NAME | CMYK IMAGE DATA FILE NAME | TRANSPARENT IMAGE DATA FILE NAME | PREVIEW |
| 1 | 2008/06/01 11:01 | Yamada | moon.doc | moon.doc | 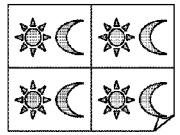 |
| 2 | 2008/06/01 11:05 | Sato | moon.doc | confidential.doc |  |
| 3 | 2008/06/01 11:30 | Tanaka | DISTRIBUTED DOCUMENT.doc | confidential.doc | 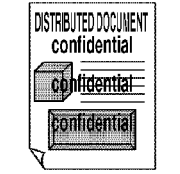 |

FIG.16

TRANSPARENT IMAGE DATA PRINT SETTING EXECUTION METHOD

APPLY CMYK IMAGE DATA PRINT SETTING ON TRANSPARENT IMAGE DATA?

- ○ AUTOMATICALLY DETERMINE ACCORDING TO IMAGE TYPE
- ● VERIFY WHEN PRINTING SECOND IMAGE DATA
- ○ YES (ALWAYS)
- ○ NO (ALWAYS)

[ OK ]  [ CANCEL ]

FIG.17

WAITING FOR PRINTING OF TRANSPARENT IMAGE DATA...

WAITING FOR START OF PRINTING OF THE FOLLOWING TRANSPARENT IMAGE DATA:

JOB START DATE AND TIME: 2008/06/01  11:01

USER NAME: Yamada

TRANSPARENT IMAGE DATA FILE NAME: moon.doc

■ PRINT SETTING
      · ENLARGEMENT/REDUCTION: 70%
      · REVERSAL

SET SHEET HAVING PRINTED CMYK IMAGE ON TRAY OR CASSETTE.
THEN PRESS "START".

REMAINING WAITING TIME: 3 MINs    [ OK ]  [ CANCEL ]

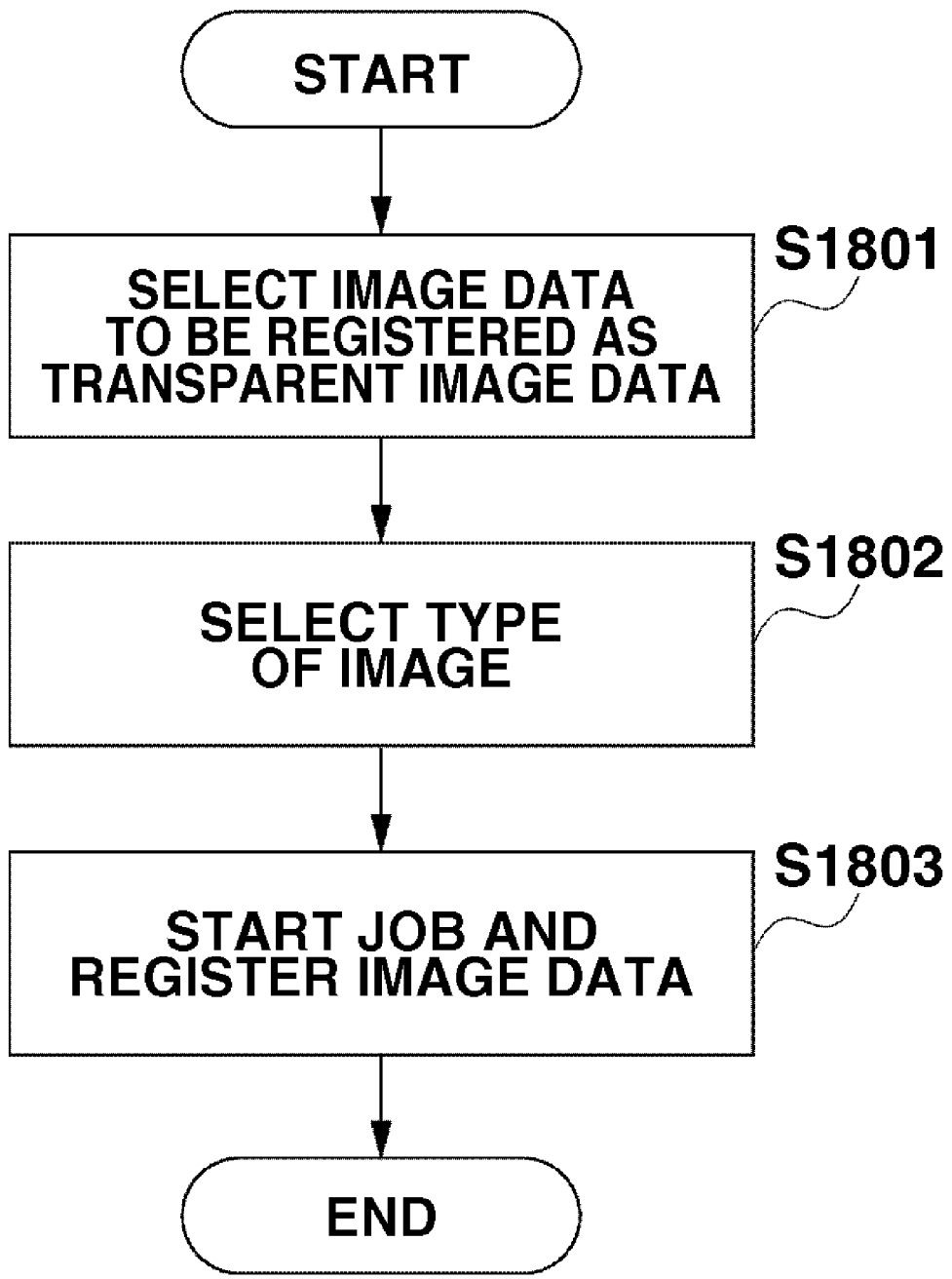

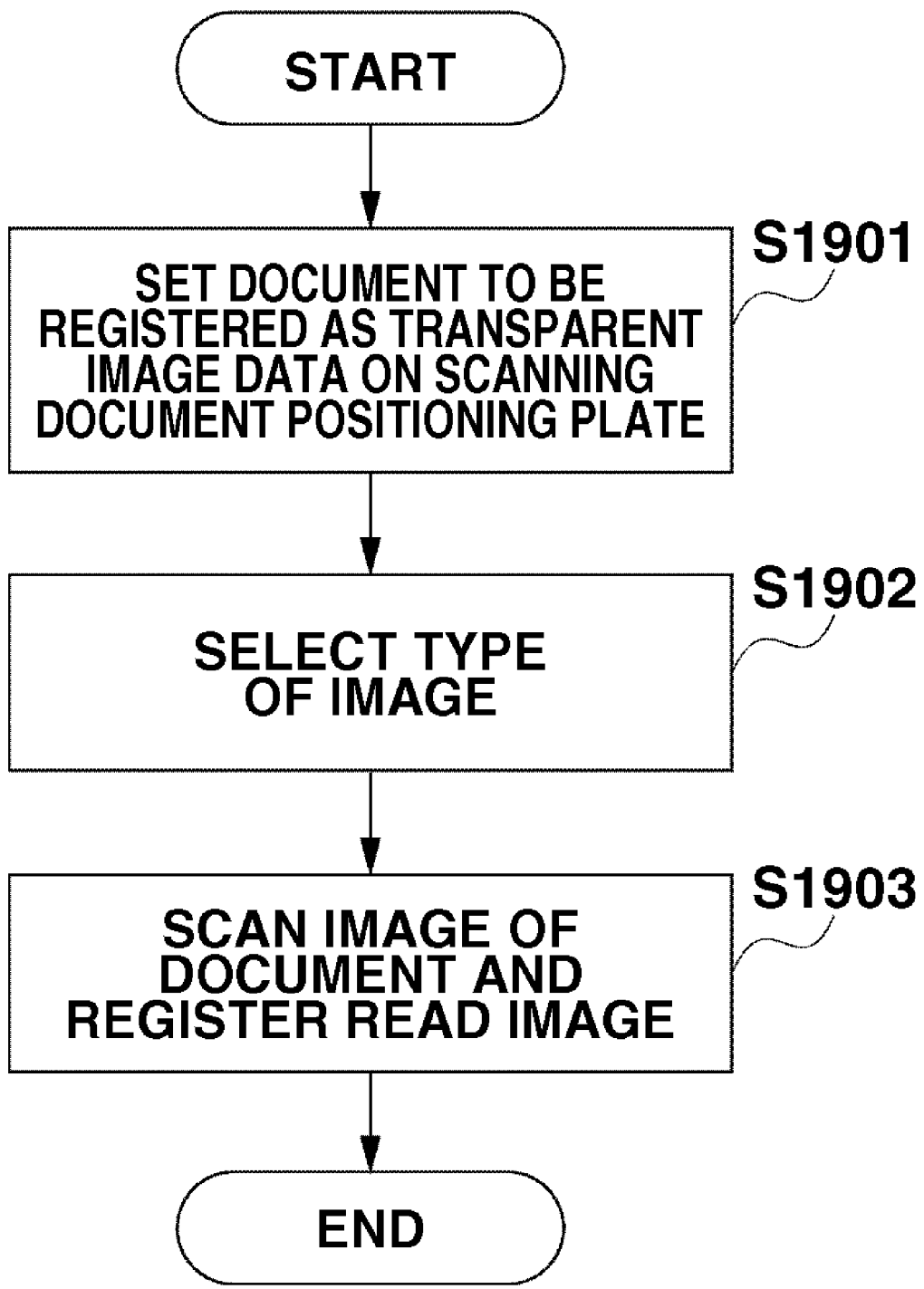

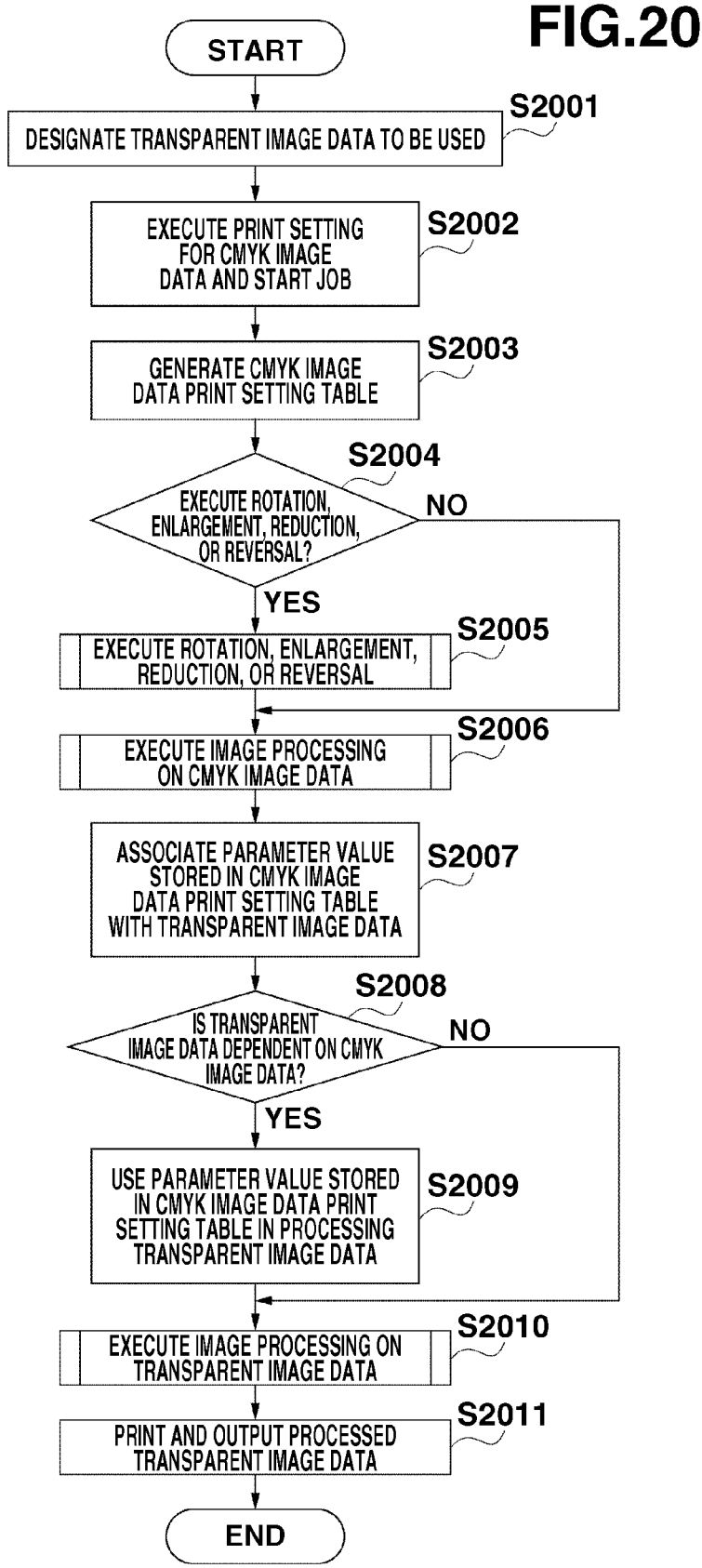

APPARATUS, METHOD, AND PROGRAM PRODUCT FOR PROCESSING COLOR AND TRANSPARENT IMAGES ACCORDING TO THE SAME LAYOUT SETTING OR NOT BASED THE DETERMINED IMAGE TYPE TO OUTPUT AS ONE IMAGE

BACKGROUND OF THE INVENTION

1. Field of the Invention

The present invention relates to an image processing apparatus and an image processing method configured to output two pieces of image data as one image and a program therefor.

2. Description of the Related Art

In the field of digital printing, a multicolor printing method that uses a special toner has attracted much attention. As an example of a special toner, a transparent toner has been used, which can provide glossiness on the surface of a print product by smoothing out irregularities of the surface of the print product.

A transparent toner is a transparent recording agent used for adding a colorless and transparent image having no pigment. In executing printing by using such a transparent toner, various visual effects can be provided on a print product by changing the number of times of fixing operations or an area of a print product on which the transparent toner is to be applied.

More specifically, when a "one-pass printing method" is used, an image is generated by using CMYK color toners and a transparent toner, and printing of the generated image on a recording sheet is completed by one fixing operation. On the other hand, when a "two-pass printing method" is used, an image is generated and fixed on a recording sheet by using CMYK color toners. In addition, in this case, a transparent image is generated on the same recording sheet by using a transparent toner and the color images and the transparent image are subjected to another fixing operation. By using the two-pass printing method, the level of glossiness on the surface of a resulting print product generally becomes higher than that achieved by the one-pass printing method.

Another conventional method superposes a transparent toner image, which is an object generated by using a transparent toner, on a part of color images generated by using CMYK color toners instead of superposing the same on the entire color images. Hereinbelow, this conventional method will be referred to as a "partial transparent print processing". When the partial transparent print processing is used, various visual effects can be provided on the surface of a print product although the type of visual effects may differ according to the type or kind of a transparent toner image to be used.

More specifically, as illustrated in FIG. 5A, a conventional method superposes a transparent toner image 502 right on a CMYK toner image 501 to fit thereon. By using a conventional method like this, a visual effect can be provided to highlight the object itself, which is generated by using the CMYK toner image 501, as an output image 503.

As illustrated in FIG. 5C, another conventional method superposes an image 508 of a text string "confidential", which is formed by using a transparent toner, on a CMYK toner image 507. By using this conventional method, a visual effect like a watermark can be provided on an output product 509. In the following description, the former transparent toner printing method will be referred to as a "CMYK image data-dependent type transparent toner printing method" while the latter will be referred to as "watermark type transparent toner printing method".

Meanwhile, during image printing processing, most electrophotographic type printer can execute image editing processing, such as rotation processing, enlargement processing, reduction processing, N-in-1 printing processing (page layout processing), image reversal processing, or negative/positive inversion processing, by using an image processing apparatus.

A conventional method discussed in Japanese Patent Application Laid-Open No. 2001-245094, when image data is read and printed from a storage device for the first time, stores a print setting, such as an attribute of a sheet used in the printing. Furthermore, in printing the once-printed image data for a second time and on, the conventional method discussed in Japanese Patent Application Laid-Open No. 2001-245094 applies the stored print setting.

In the method discussed in Japanese Patent Application Laid-Open No. 2001-245094, the print setting used in the first-time printing is applied as it is in the second-time printing. To paraphrase this, the conventional method discussed in Japanese Patent Application Laid-Open No. 2001-245094 does not change the print setting for the image data to be printed for the second time according to the content of the image data to be printed for the second time. In addition, when this conventional method is used, the editing processing cannot be automatically changed according to the content of the image data to be printed for the second time. Accordingly, the conventional method discussed in Japanese Patent Application Laid-Open No. 2001-245094 cannot effectively save a user from having to execute complicated operations.

In performing printing in which editing processing is executed on image data to be printed by using CMYK toners (hereinafter simply referred to as "CMYK image data"), and image data to be printed by using a transparent toner (hereinafter simply referred to as "transparent image data") is to be superposed on the CMYK image data, the following two types of processing can be executed on the transparent image data. More specifically, in some cases, the user may desire to execute the same processing as executed on CMYK image data on the transparent image data while in other cases, the user may not.

If the transparent image data is CMYK image data-dependent type image data, the user may expect and desire to execute the same processing as executed on CMYK image data on the transparent image data. More specifically, in this case, as illustrated in FIG. 5B, the user may desire to obtain an output image 506 by using an image of transparent image data 505, which has the same 4-in-1 layout as an image of CMYK image data 504 and which is superposed on the image of the CMYK image data 504.

If the type of transparent image data is the watermark type and if the corresponding transparent image has a 4-in-1 layout, the size of each character included in the watermark may become very small. In this case, the visibility of the watermark may be degraded. Therefore, it is not particularly necessary to set the same layout setting for transparent image data as that for CMYK image data. More specifically, as can be known from an example illustrated in FIG. 5D, if the size of transparent image data 511, which is to be superposed on an image of CMYK image data 510 having a 4-in-1 layout, is not set to the same size as that of the CMYK image data 510, then an output product 512 is achieved, whose visibility of the character string "confidential" is not degraded.

As described above, it is necessary to determine whether to apply the same print setting as the print setting that has been set and used for CMYK image data on transparent image data according to the content and the purpose of use of the transparent image data. In a conventional method, a user verifies the content and the purpose of use of transparent image data to execute the above-described determination where necessary. Accordingly, the conventional method like this cannot save a user from having to execute complicated operations.

If the content of a setting that has been set to CMYK image data, such as "reduce the image size down to 70% and reverse the image", is to be applied on transparent image data, it is necessary for the user to memorize the content of the setting set to the CMYK image data, and execute the setting of the same setting content to the transparent image data. In this case, if the user sets a wrong setting content by mistake or makes a mistake during an operation for setting the setting content, the same processing as executed on the CMYK image data may not be executed on the transparent image data.

It is sometimes necessary to execute a different setting of image processing based on the type of image data (CMYK image data or transparent image data). More specifically, it is necessary to set different parameters of gamma correction processing or image formation processing for each of transparent image data and CMYK image data. Accordingly, if the same setting as that set for CMYK image data is executed and used on the transparent image data, the transparent image data may not be appropriately processed.

In printing transparent image data, it is necessary to execute processing for generating transparent image data based on a general-purpose image data. Accordingly, if the same setting as that set for CMYK image data is executed and used on transparent image data in printing the transparent image data, the processing for generating the transparent image data cannot be executed. As described above, it is necessary to execute processing unique to each of CMYK image data and transparent image data. Accordingly, the above-described conventional method discussed in Japanese Patent Application Laid-Open No. 2001-245094 cannot execute different processing for each of CMYK image data and transparent image data.

SUMMARY OF THE INVENTION

According to an aspect of the present invention, an image processing apparatus includes a setting unit configured to execute a layout setting on first image data, a determination unit configured to determine an image type of second image data, an image processing unit configured, if it is determined, as a result of determination by the determination unit, that the image type of the second image data is an image type for applying a layout setting set for the first image data, to execute image processing on the second image data according to the layout setting set for the first image data, and if it is determined, as a result of determination by the determination unit, that the image type of the second image data is an image type for not applying a layout setting set for the first image data, the image processing unit is configured not to execute image processing on the second image data according to the layout setting set for the first image data, and an output unit configured to form an image of the first image data that has been processed according to the layout setting set by the setting unit, to output the first image data on a printing sheet by using color toners, to form an image of the second image data that has been processed by the image processing unit, and to output the second image data on the printing sheet by using a transparent toner.

According to an aspect of the present invention, in printing an image including first image data and second image data, the second image data can be appropriately subjected to processing based on the content and the purpose of use of the first image data without requiring a user to execute complicated operations. Accordingly, according to an aspect of the present invention, the image including the first image data and the second image data can be appropriately output as the user desires.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

FIG. 9 illustrates an example of a print setting table.

FIG. 10 illustrates an example of a user interface (UI) screen for selecting a type of image data to be registered.

FIG. 11 illustrates an example of a UI screen for selecting a type of image data to be registered.

FIG. 12 illustrates an example of a UI screen for designating a print setting and transparent image data.

FIG. 13 illustrates an example of a UI screen displayed when printing of transparent image data, which is printed by using a two-pass printing method, is started.

FIG. 14 illustrates an example of a user verification UI screen, which is displayed when printing of transparent image data, which is printed by using a two-pass printing method, is started.

FIG. 15 illustrates an example of a job list UI screen displayed when the two-pass printing method is executed.

FIG. 16 illustrates an example of a mode setting UI screen used in setting a print setting to transparent image data.

FIG. 17 illustrates an example of a UI screen displayed while waiting for printing of transparent image data to be printed by using the two-pass printing method.

FIG. 18 is a flow chart illustrating an example of processing for registering transparent image data by using a printer driver.

FIG. 19 is a flow chart illustrating an example of processing for registering transparent image data acquired by scanning a document.

FIG. 20 is a flow chart illustrating an example of processing executed when one-pass printing method is performed.

DESCRIPTION OF THE EMBODIMENTS

Various exemplary embodiments, features, and aspects of the invention will be described in detail below with reference to the drawings.

In a first exemplary embodiment of the present invention, first image data is generated by using CMYK toners. In addition, second image data is generated by using a transparent toner. Furthermore, in the present exemplary embodiment, it is supposed that a one-pass printing method, in which processing from feeding to discharge of a recording sheet is executed by one operation (i.e., processing including only one fixing operation), is executed.

In addition, in the present exemplary embodiment, in printing CMYK image data input to an image processing apparatus, transparent image data is used, which has been previously registered on a memory of the image processing apparatus. Furthermore, it is supposed, in the present exemplary embodiment, that an image generated based on the transparent image data is superposed on an image generated based on the CMYK image data, and that the color images and the transparent image are simultaneously fixed. Furthermore, in the present exemplary embodiment, it is supposed that the simultaneously fixed images are printed by the one-pass printing method.

In the following description, a "UI" includes monitoring of both the local PC 102 and an operation unit 317 of each of the MFPs 101 and 103.

Figure 1:
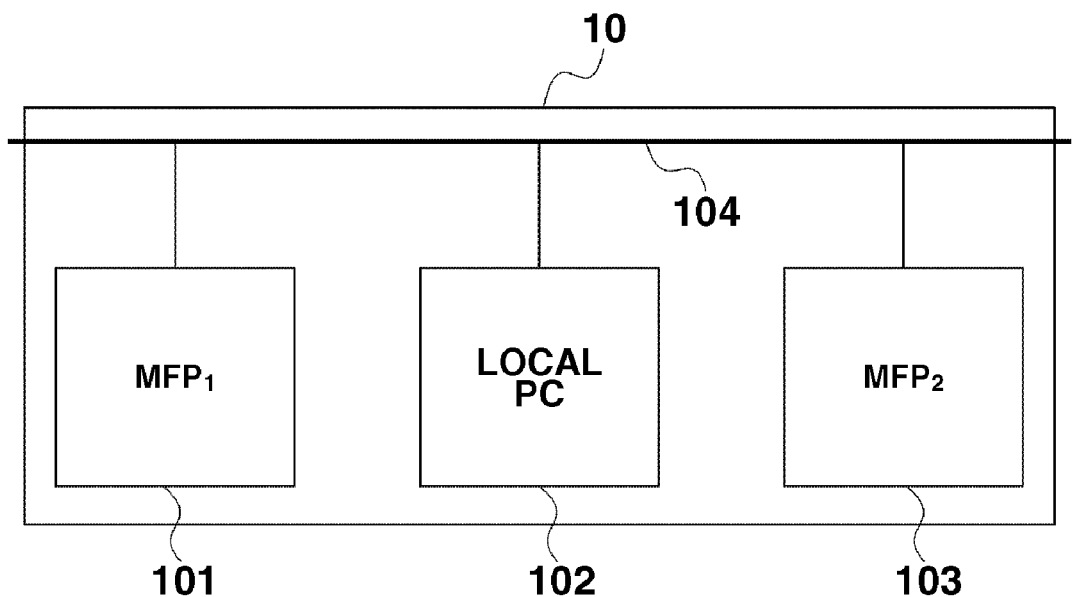
FIG. 1 is a block diagram illustrating an exemplary configuration of an image processing system according to an exemplary embodiment of the present invention.

FIG. 1 illustrates an example of an image forming apparatus according to the exemplary embodiment of the present invention.

Referring to FIG. 1, a local area network (LAN) 104 is built within an office 10. The MFPs, as recording apparatuses, 101 and 103, and the local PC 102 are connected to the LAN 104. Each of the MFPs 101 and 103 has a function for reading an image of a document. The MFPs 101 and 103 execute image processing on the read document image. After being subjected to the image processing, the document image is printed by the MFP that has read the document image.

Alternatively, if the MFP 101 has read an image of a document, it is also possible if the MFP 103 executes image processing and prints the read document image. In addition, it is also possible if the local PC 102 transmits page description language (PDL) data to the MFPs 101 or 103, and the MFPs 101 or 103 interprets and prints the received data.

Figure 2:
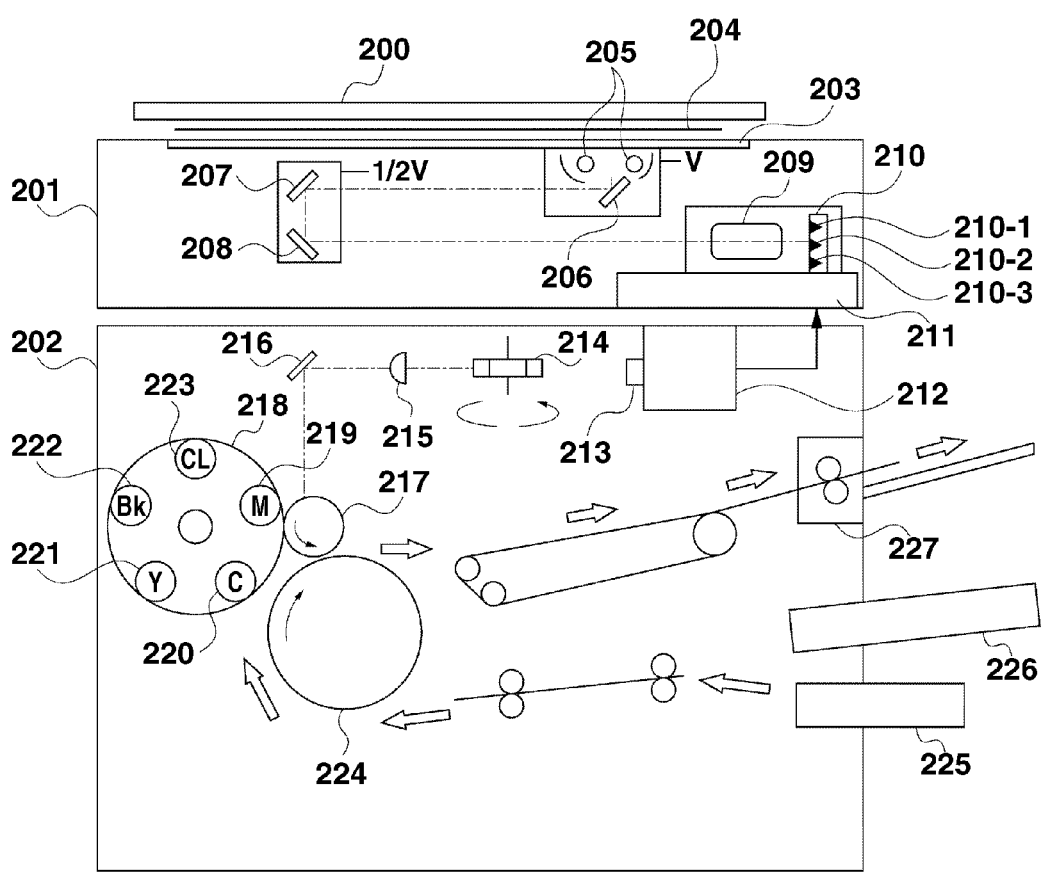
FIG. 2 is a cross section illustrating an exemplary configuration of each of a reader unit and a printer unit of a multifunction peripheral (MFP).

FIG. 2 illustrates an exemplary hardware configuration of each of the MFPs 101 and 103. FIG. 2 illustrates an exemplary functional configuration of each of the MFPs 101 and 103. The MFPs 101 and 103 have the same configuration described below. An operation executed in performing the one-pass printing method will be described in detail below with reference to FIG. 2.

Referring to FIG. 2, an image scanner (image reading unit) 201 reads an image of a document, and executes processing for converting the read document image into a digital signal. In addition, the printer unit 202 prints the document image read by the image scanner 201 on a sheet.

The image scanner 201 includes a mirror platen 200. A document 204 set on a document positioning glass (hereinafter simply referred to as a "platen") 203 is irradiated with light by a lamp 205. Then the light reflected on the surface of the document 204 is guided into mirrors 206, 207, and 208. Then, the light reflected on the mirrors 206, 207, and 208 goes through a lens 209, and an image of the read document is formed on a three-line solid-state image sensor (hereinafter simply referred to as a "charge-coupled device (CCD) sensor") 210. The CCD 210 transmits three image signals of red (R), green (G), and blue (B) (RGB) color information to a data processing apparatus 211.

The lamp 205 and the mirror 206 mechanically move in a sub scanning direction (a direction perpendicular to an electrical scanning direction (main scanning direction)) of a line sensor at a velocity v. The mirrors 207 and 208 mechanically move in the sub scanning direction of the line sensor at a velocity of ½ v. Thus, the entire surface of the document is scanned (sub scanned). In the present exemplary embodiment, the document 204 is read at a resolution of 600 dots per inch (dpi) in both the main scanning direction and the sub scanning direction. An image signal generated based on the read document image is stored in a data storage unit of the data processing apparatus 211 in the unit of data corresponding to one page of the document.

The data processing apparatus 211 electrically processes the image signals stored therein in the unit of a pixel. Furthermore, the data processing apparatus 211 separates the image signal into C, M, Y, and K components. In addition, the data processing apparatus 211 transmits the resulting C, M, Y, and K signals to the printer unit 202. Moreover, the data processing apparatus 211 generates transparent image data (CL) in the unit of a pixel. The data processing apparatus 211 transmits the resulting transparent image signal to the printer unit 202. More specifically, the transmitted C, M, Y, K, and CL image signals are further transmitted to a laser driver 212. The laser driver 212 modulates and drives a semiconductor laser 213 according to the received image signals.

A surface of a photosensitive drum 217 is scanned with a laser beam emitted from the semiconductor laser 213 via the polygon mirror 214, an f-θ lens 215, and a mirror 216. In the present exemplary embodiment, the laser beam has the resolution of 600 dpi, which is the same level as the resolution used in reading the document image, in both main scanning direction and the sub scanning direction. A rotation and development unit 218 includes a magenta development unit 219, a cyan development unit 220, a yellow development unit 221, a black development unit 222, and a clear (transparent) development unit 223. The five development units 219 through 223 come into contact with the photosensitive drum 217 one after another to develop electrostatic latent images formed on the photosensitive drum 217 by using each of color toners and a transparent toner.

A sheet fed from a sheet cassette 225 or 226 is wound around a transfer drum 224. The toner image developed on the photosensitive drum 217 is transferred by the transfer drum 224 onto the sheet.

After the toner images of five components of C, M, Y, K, and CL are serially transferred onto the sheet, the sheet having the transferred images is conveyed to a fixing unit 227. The fixing unit 227 fixes the toner images on the sheet. Then, the sheet having the fixed images is discharged from the MFP. The one-pass printing method is executed in the above-described manner. On the other hand, when the two-pass printing method is executed, printing is executed in the following manner. More specifically, in this case, CMYK toner images only are formed and fixed first. Then, a transparent toner image is formed and fixed in the above-described manner. Then, the sheet having the toner images of five components is discharged from the MFP.

Now, an exemplary functional configuration of each of the MFPs 101 and 103 will be described in detail below with reference to a block diagram illustrated in FIG. 3.

Figure 3:
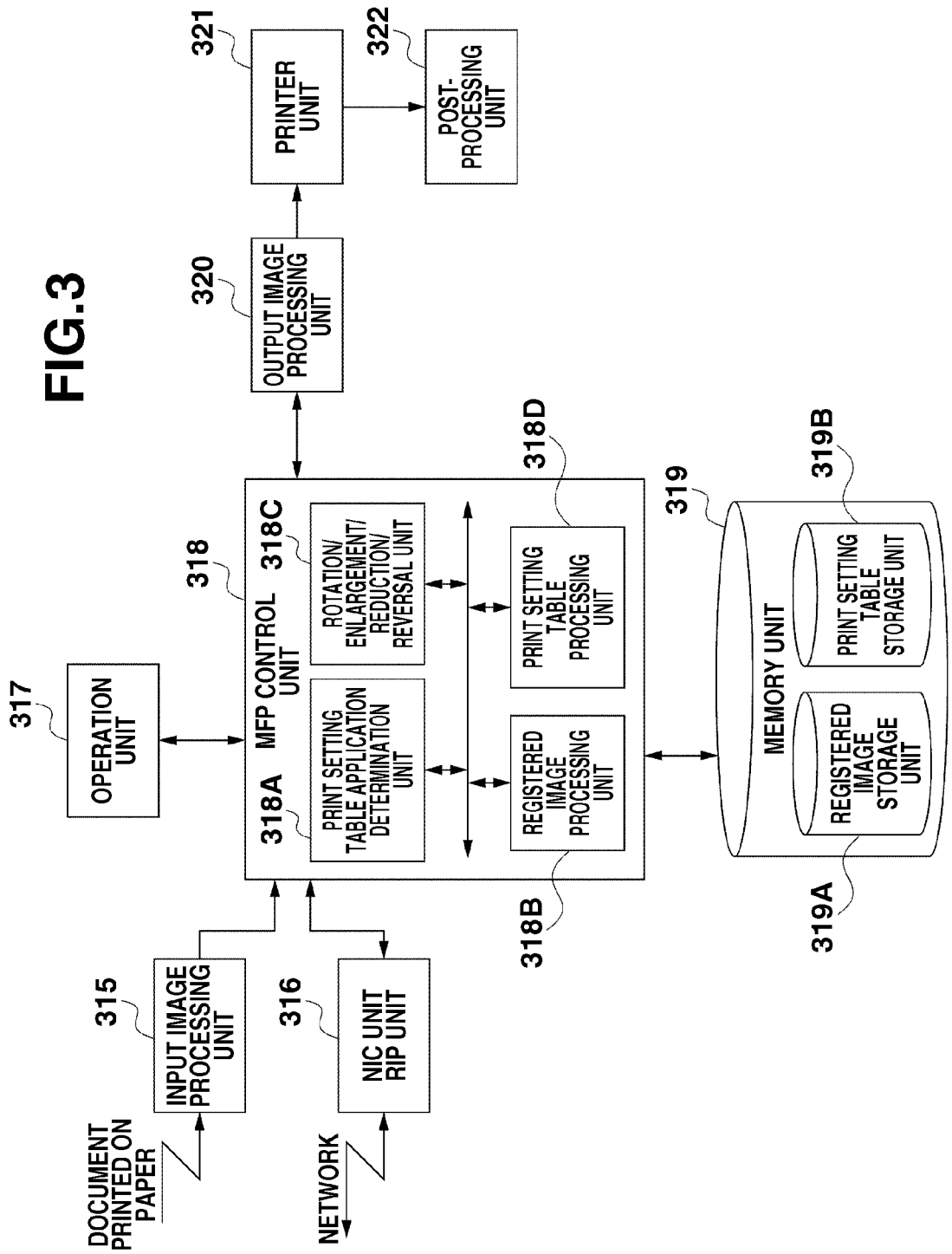
FIG. 3 is a block diagram illustrating an exemplary configuration of the MFP.

Referring to FIG. 3, an input image processing unit 315, an network interface card (NIC)/raster image processor (RIP) unit 316, an operation unit 317, an MFP control unit 318, a memory unit 319, and an output image processing unit 320 are included in the data processing apparatus 211 illustrated in FIG. 2. A printer unit 321 and a post-processing unit 322 are included in the printer unit 202 illustrated in FIG. 2. In the example illustrated in FIG. 3, the input image processing unit 315 reads an image of a document printed on a sheet by using an image reading device, such as the image scanner 201. In addition, the input image processing unit 315 executes image processing on the read image data.

The NIC unit of the NIC/RIP unit 316 transfers image data (principally PDL data) input via a network to the RIP unit. In addition, the NIC unit of the NIC/RIP unit 316 transmits image data stored in the MFP and information about the MFP to an external apparatus via the network. Furthermore, the RIP unit of the NIC/RIP unit 316 interprets the input PDL data and rasterizes the interpreted PDL data by raster image processing (RIP).

Then, the input image data is transmitted to the MFP control unit 318. The MFP control unit 318 controls the traffic of data input to or output by the MFP. The MFP control unit 318 includes a central processing unit (CPU), a read-only memory (ROM), and a random access memory (RAM).

The image data input to the MFP control unit 318 is temporarily stored on the memory unit 319. The temporarily stored image data is called where necessary. In addition, the MFP control unit 318 includes the following processing units.

The print setting table application determination unit 318A determines whether to apply a parameter value stored in a print setting table, which is described below, during print processing. A registered image processing unit 318B stores the image data on a registered image storage unit 319A of the memory unit 319. In addition, the registered image processing unit 318B calls the image data from the registered image storage unit 319A. A rotation/enlargement/reduction/reversal processing unit 318C executes image processing, such as rotation processing, enlargement processing, reduction processing, reversal processing, or N-in-1 composition processing.

A print setting table processing unit 318D generates a print setting table. In addition, the print setting table processing unit 318D applies the generated print setting table on image data during print processing.

In addition, the MFP control unit 318 stores the print setting table on a print setting table storage unit 319B of the memory unit 319. Furthermore, the MFP control unit 318 calls the print setting table from the print setting table storage unit 319B. The output image processing unit 320 executes image processing necessary for printing the image data. After executing the necessary image processing on the image data, the output image processing unit 320 transmits the processed image data to the printer unit 321. The necessary image processing particularly includes gamma correction processing and image formation processing, which is changed based on to which color film each image data corresponds.

The printer unit 321 feeds a sheet to serially print the image data generated by the output image processing unit 320 on the sheet thereon. The sheet having the image printed thereon is conveyed to the post-processing unit 322. The post-processing unit 322 executes post-processing, such as sorting and finishing.

A user can select processing and a function that the user desires to execute, from among various flows and functions described above, and give an instruction for executing an operation via the operation unit 317. Since the resolution of a display device of the operation unit 317 has been sufficiently high in these days, it is also useful if the following method is used. More specifically, in this case, the user previews the image data stored on the memory unit. Furthermore, if it is verified by the user that the image data corresponds to the image that the user desires to print, then the present exemplary embodiment prints the same. As described above, in the present exemplary embodiment, the MFP 101 and 103 have various useful functions and methods of use.

Now, image rotation processing, enlargement and reduction (magnification) processing will be described in detail below with reference to FIGS. 4, 7, and 8 as an example of the processing executed by the rotation/enlargement/reduction/reversal processing unit 318C.

A graphic processor (not illustrated) provided within the MFP control unit 318 receives image data from a main controller (not illustrated). In addition, the graphic processor executes predetermined processing, such as image rotation processing, according to an instruction from the main controller. Furthermore, the graphic processor transmits a result of the processing to the main controller.

Figure 4:
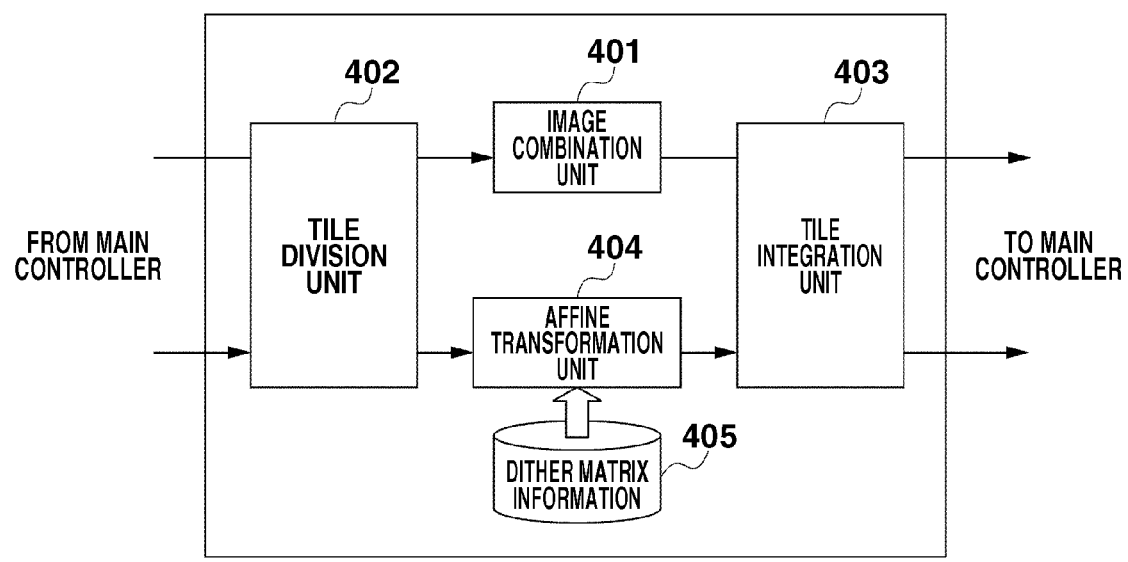
FIG. 4 is a block diagram illustrating an exemplary configuration of a rotation/enlargement/reduction/reversal processing unit 318C.

FIG. 4 illustrates exemplary processing blocks included in the graphic processor. Referring to FIG. 4, a tile division unit 402 divides the image signal received from the main controller into small "tiles", each of which having a square shape. The main controller instructs the size of the tile, which is arbitrarily determined. In the present exemplary embodiment, for easier understanding, it is supposed that the size of a dither matrix is used as the size of the tile.

The image divided into tiles is transmitted to the image combination unit 401 or an affine transformation unit 404 where necessary, according to an instruction given by the main controller. The image combination unit 401 receives two pieces of image data from the main controller, and temporarily stores the two pieces of received image data. In addition, the image combination unit 401 executes combination processing on the two pieces of temporarily stored image data.

The two pieces of image data is combined in the following manner. More specifically, let "A" and "B" be pixel values of a target pixel of each of the two pieces of image data, then a pixel value of an output image can be calculated by either one of the following expressions:

$$A \times B / 256$$

$$\{A \times \alpha + B \times (256 - \alpha)\} / 256$$

where "α" denotes a ratio of combination. Alternatively, it is also useful if a pixel value of an output image is calculated by a calculation method in which the image combination unit 401 acquires and uses the pixel value greater of the pixel values A and B. However, the present embodiment is a mere example, and the calculation method is not limited to those described above.

The image combination unit 401 has a function for generating the combination ratio α. More specifically, the image combination unit 401 can calculate the combination ratio a based on the pixel value of the image data.

After being subjected to the combination processing, the image data is transferred by the tile integration unit 403 to an appropriate location of a buffer having a predetermined size, which is secured on a static random access memory (SRAM) (not illustrated) provided within the MFP control unit 318. After all the tiles have been processed by the image combination unit 401, then the graphic processor reads the image from the SRAM, and transmits the read image to the main controller.

The affine transformation unit 404 executes affine transformation processing on the image data according to a parameter setting, which has been set by the main controller and is necessary for executing image rotation and magnification processing.

Now, an exemplary flow of processing executed by the graphic processor during an affine transformation operation will be described in detail below with reference to FIG. 7 will be described in detail below. Each processing of the processing flow illustrated in FIG. 7 is implemented by the graphic processor, which operates under control of the CPU included in the MFP control unit 318.

Figure 7:
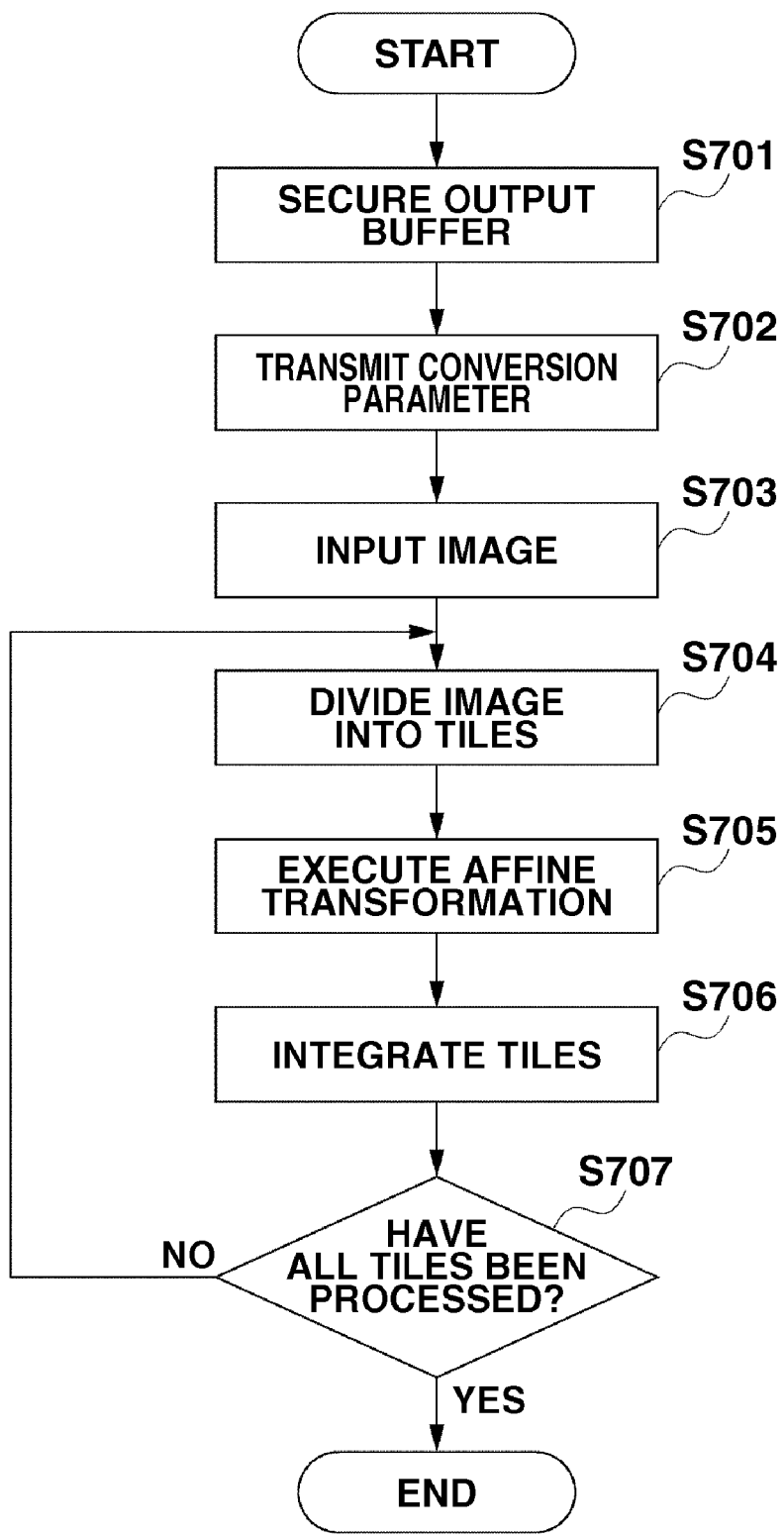
FIG. 7 is a flow chart illustrating an exemplary flow of processing executed by a graphic processor.

Referring to FIG. 7, in step S701, the graphic processor secures an output buffer of a size large enough to store an image, which is generated as a result of the processing illustrated in FIG. 7, on the SRAM according to the setting of the rotational angle and the magnification ratio instructed by the main controller. In step S702, the graphic processor transmits the setting of the rotational angle and the magnification ratio in each of the main scanning direction and the sub scanning direction to the affine transformation unit 404.

In step S703, the graphic processor receives the image data transmitted from a bus controller (not illustrated) of the main controller. Furthermore, in step S703, the graphic processor temporarily stores the received image data on the SRAM. In step S704, the graphic processor controls the tile division unit 402 so that the image is divided into tiles.

Figure 8A:
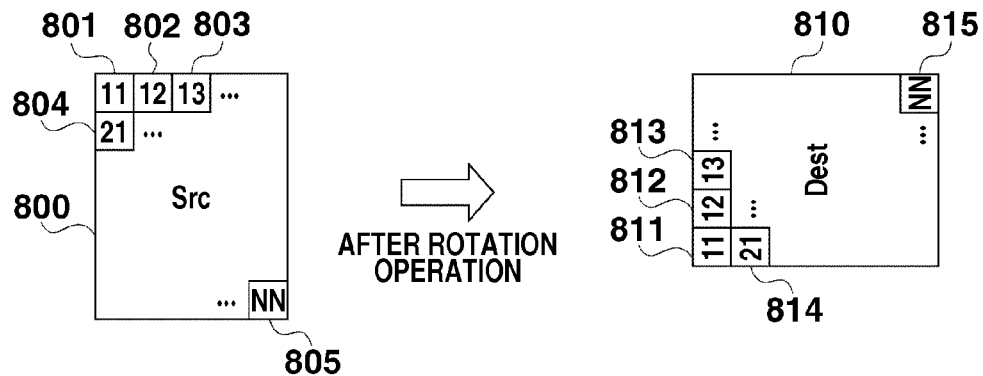
FIGS. 8A and 8B schematically illustrate an image tiling operation executed during affine transformation.

In the present exemplary embodiment, the image is divided into tiles in the above-described manner. More specifically, as illustrated in FIG. 8A, the tile division unit 402 divides an image 800, which is a tile division target image, into a plurality of tiles according to the tile size, an address of a tile header portion, and an offset interval between tiles. It is supposed that the tile size, the address of the tile header portion, and the offset interval between tiles have been previously set. More specifically, the tile division unit 402 divides the image 800 into a plurality of tiles including a tile-11 801, a tile-12 802, a tile-13 803, a tile-21 804, . . . and a tile-NN 805. The graphic processor controls the tile division unit 402 so that the image divided into tiles is transmitted to the affine transformation unit 404.

In step S705, the graphic processor executes control of the affine transformation unit 404 for executing affine transformation on the tiled image according to the setting set by the main controller. The tiled image that has been subjected to the affine transformation is then transmitted to the tile integration unit 403. In step S706, the graphic processor controls the tile integration unit 403 so that the tile integration unit 403 arranges the affine-transformed image in the output buffer secured on the SRAM.

FIG. 8A schematically illustrates an operation for integrating divided tiles after being rotated by 90 degrees. More specifically, when rotated by 90 degrees counterclockwise as illustrated in FIG. 8A, the tile-11 801, the tile-12 802, the tile-13 803, the tile-21 804, . . . and the tile-NN 805 come to locations 811 through 815 respectively. In addition, the tile integration unit 403 arranges the tiled images, which have been rotated by 90 degrees counterclockwise, to a predetermined location on the output buffer. The predetermined location is set at a location that is appropriate when the tiled image is rotated by 90 degrees. Thus, an image 810, which has been rotated by 90 degrees counterclockwise, can be obtained.

Figure 8B:
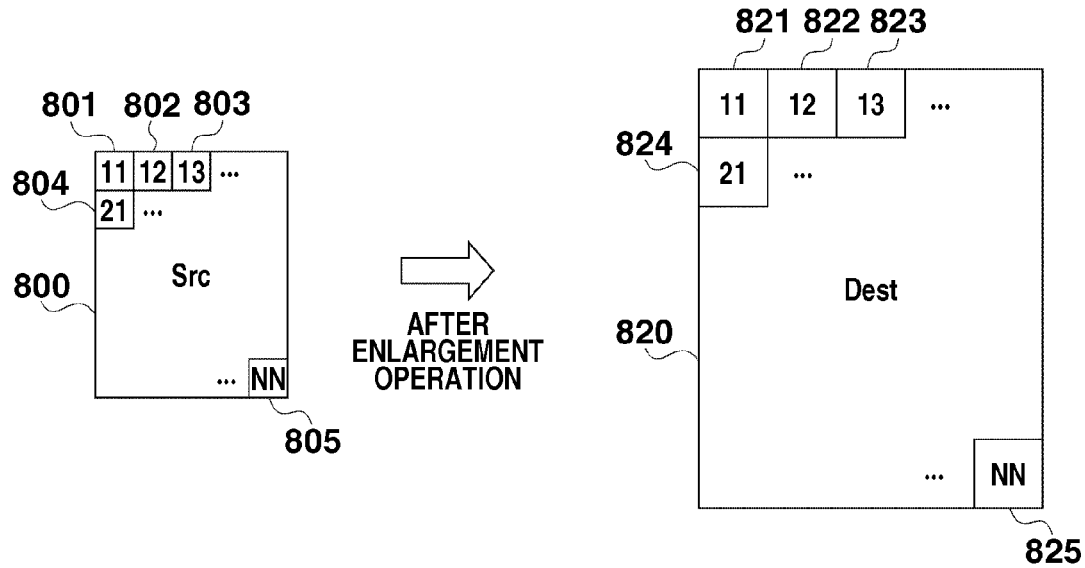

FIG. 8B schematically illustrates an operation for integrating divided tiles after being enlarged twice as large as the original size. More specifically, when enlarged twice as large as the original size as illustrated in FIG. 8B, the tile-11 801, the tile-12 802, the tile-13 803, the tile-21 804, . . . , and the tile-NN 805 are twice-enlarged, respectively illustrated as the tile-11 821, the tile-12 822, the tile-13 823, the tile-21 824, . . . , and the tile-NN 825. In addition, the tile integration unit 403 arranges the twice-enlarged tiled images to a predetermined location on the output buffer, which is set at a location that is appropriate when the tiled image is enlarged twice as large as the original size. Thus, an image 820, which has been enlarged twice as large as the original size, can be obtained.

In step S707, the graphic processor determines whether all the tiles have been processed. If it is determined that all the tiles have not been processed yet (No in step S707), then the processing returns to step S704. On the other hand, if it is determined that all the tiles have been processed (Yes in step S707), then the processing proceeds to step S708. In step S708, the graphic processor reads the image data, whose tiles have been integrated, from the SRAM. Furthermore, in step S708, the graphic processor transmits the image data to the main controller. Then the processing ends.

Now, processing for registering transparent image data will be described in detail below with reference to FIGS. 18 and 19. FIG. 18 is a flow chart illustrating an example of processing for storing transparent image data on the registered image storage unit 319A by using PDL data.

Referring to FIG. 18, in step S1801, the user selects the image data to be registered as transparent image data via the UI. In step S1802, the user designates an image type of the image data to be registered via the UI. More specifically, the user executes the selection as to which of the CMYK image data-dependent type image data and the watermark type image data the registration target image data is. In the present exemplary embodiment, the CMYK image data-dependent type image data is used as a "first image type" while the watermark type image data is used as a "second image type".

In step S1803, after receiving the selection from the user, the MFP control unit 318 reads the image data and registers the image data, whose image type has been designated by the user, on the registered image storage unit 319A of the memory unit 319 of the image processing apparatus (MFP).

FIG. 19 is a flow chart illustrating an example of processing for scanning the image desired by the user to be used as the transparent image and storing the image data obtained by the scanning on the registered image storage unit 319A as transparent image data.

Referring to FIG. 19, in step S1901, the user sets a document to be registered within the image processing apparatus to use the same as a transparent image on the scanning document positioning plate. Then, the processing proceeds to step S1902. In step S1902, the user designates the image type of the image data to be registered via the UI. More specifically, the user executes the selection as to which of the CMYK image data-dependent type image data or the watermark type image data the registration target image data is.

In step S1903, after receiving the selection from the user, the MFP control unit 318 reads the image data, and registers the image data, whose image type has been designated by the user, on the registered image storage unit 319A of the memory unit 319 of the image processing apparatus (MFP). An example of a UI used in registering the image data by executing the processing in FIGS. 18 and 19 is illustrated in FIG. 10. The user can input a name and an image type of the transparent image data to be registered via the UI illustrated in FIG. 10.

Now, an exemplary flow of image processing executed on CMYK image data will be described in detail below with reference to FIG. 24. The image processing on CMYK image data is implemented by the CPU (not illustrated) of the MFP control unit 318.

Figure 24:
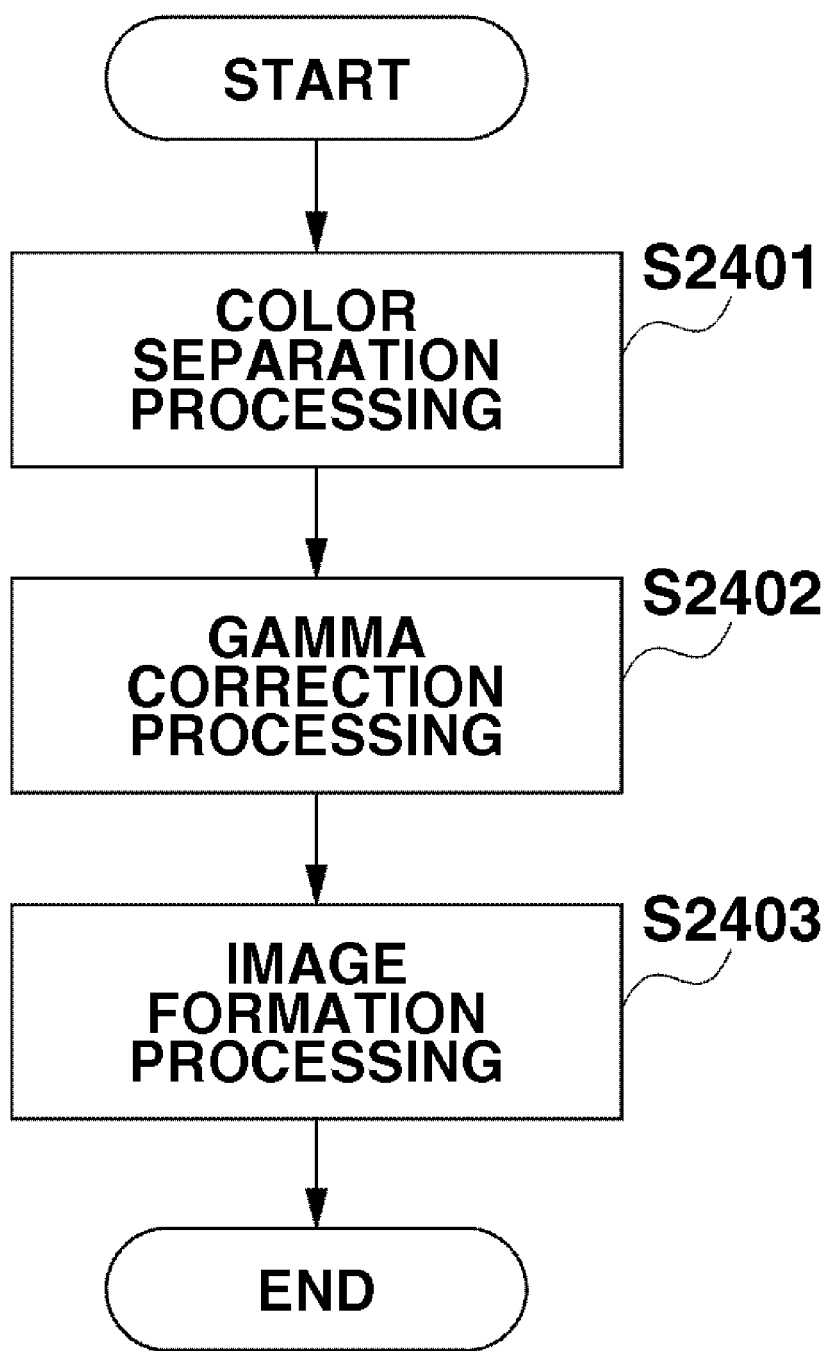
FIG. 24 is a flow chart illustrating an example of image processing to be executed on CMYK image data.

Referring to FIG. 24, in step S2401, after PDL data from the local PC 102 and input data from the MFPs 101 and 103 is input as RGB image signals, the input RGB signals are converted into CMYK signals by color processing in step S2401. The conversion into CMYK signals is executed by matrix calculation expressed by an expression (1) or interpolation calculation that uses a lookup table.

$$\begin{pmatrix} C \\ M \\ Y \\ K \end{pmatrix} = \begin{pmatrix} A1 & A2 & A3 \\ A4 & A5 & A6 \\ A7 & A8 & A9 \\ A10 & A11 & A12 \end{pmatrix} \begin{pmatrix} R \\ G \\ B \end{pmatrix} \quad (1)$$

If CMYK signals are transmitted from the local PC 102, the processing proceeds to step S2402. In step S2402, the CPU of the MFP control unit 318 executes gamma correction processing. More specifically, in step S2402, the CPU of the MFP control unit 318 executes gamma correction processing on each color signal that is appropriate for the MFPs 101 and 103. In step S2403, the CPU of the MFP control unit 318 executes image formation processing on each color image data. The image formation processing includes screening processing and error diffusion processing. Different parameters for the gamma correction processing and the image formation processing are used for different colors.

Now, an exemplary flow of image processing on transparent image data will be described in detail below with reference to FIG. 25. The image processing on transparent image data is implemented by the CPU (not illustrated) of the MFP control unit 318.

Figure 25:
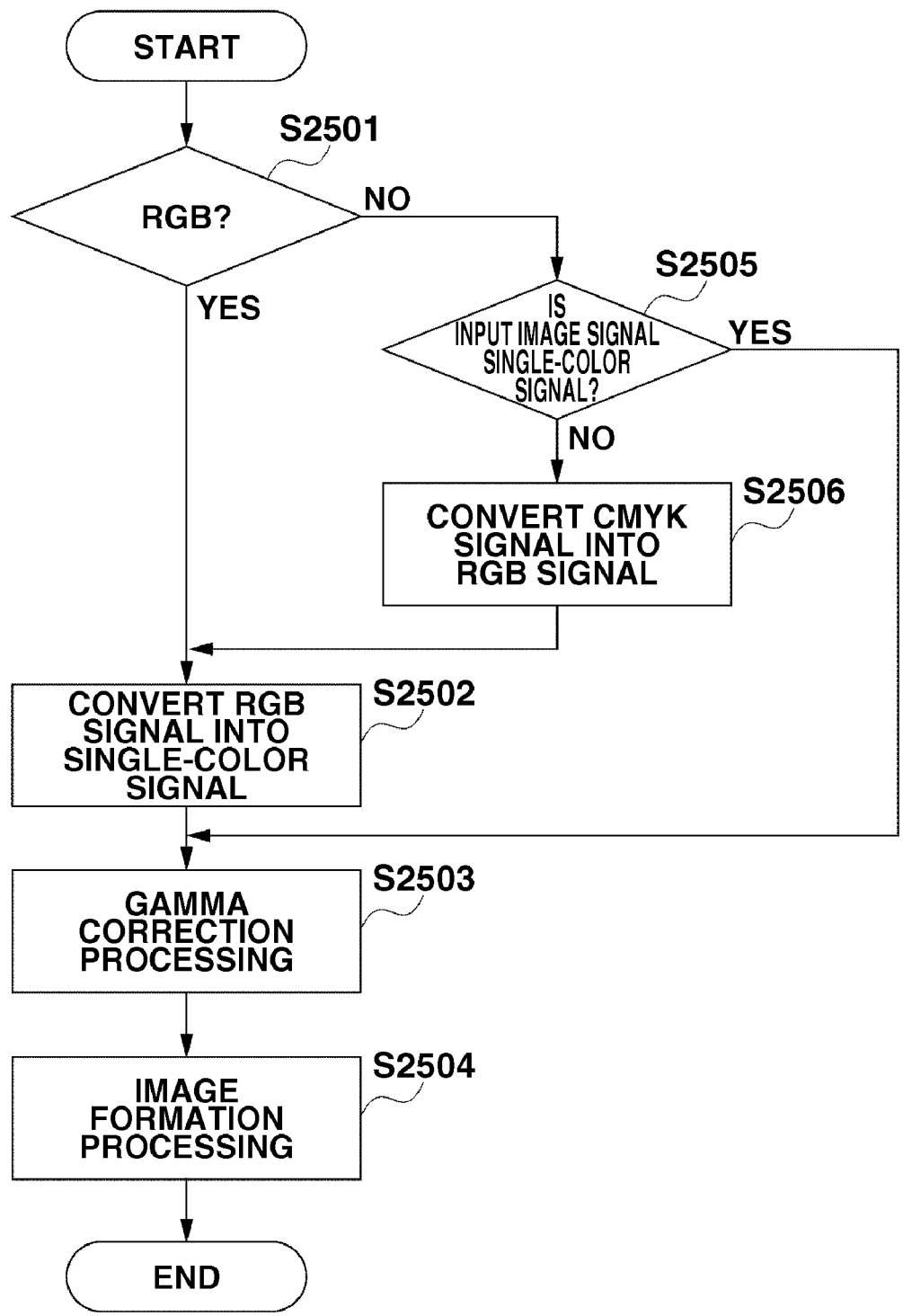
FIG. 25 is a flow chart illustrating an example of image processing to be executed on transparent image data.

Referring to FIG. 25, in step S2501, the CPU of the MFP control unit 318 determines whether image signals input from the local PC 102, and the MFPs 101 and 103 are RGB signals. If it is determined that the image signals input from the local PC 102, and the MFPs 101 and 103 are RGB signals (Yes in step S2501), then the processing proceeds to step S2502. On the other hand, if it is determined that the image signals input from the local PC 102, and the MFPs 101 and 103 are not RGB signals (No in step S2501), then the processing proceeds to step S2505. In step S2505, the CPU of the MFP control unit 318 determines whether the image signals input from the local PC 102, and the MFPs 101 and 103 are single-color signals. If it is determined that the image signals input from the local PC 102, and the MFPs 101 and 103 are single-color signals (Yes in step S2505), then the processing proceeds to step S2503.

On the other hand, if it is determined that the image signals input from the local PC 102, and the MFPs 101 and 103 are not single-color signals (i.e., if the image signals are determined to be CMYK signals) (No in step S2505), then the processing proceeds to step S2506. In step S2506, the CPU of the MFP control unit 318 converts the input CMYK signals into RGB signals. The conversion into RGB signals is executed by using matrix calculation expressed by the following expression (2):

$$\begin{pmatrix} R \\ G \\ B \end{pmatrix} = \begin{pmatrix} B1 & B2 & B3 & B4 \\ B5 & B6 & B7 & B8 \\ B9 & B10 & B11 & B12 \end{pmatrix} \begin{pmatrix} C \\ M \\ Y \\ K \end{pmatrix} \quad (2)$$

In step S2502, the CPU of the MFP control unit 318 converts the RGB signals into a single-color signal having one color component. The conversion in step S2502 is executed by using a publicly known calculation method. The calculation method is not limited to a specific method. In the present exemplary embodiment, the CPU of the MFP control unit 318 converts the CMYK signals into RGB signals, and further converts the RGB signals into a single-color signal having one color component. However, the present exemplary embodiment is not limited to this. More specifically, it is also useful if the CPU of the MFP control unit 318 converts the CMYK signals directly into a single-color signal having one color component by using a publicly known signal conversion method.

In step S2503, the CPU of the MFP control unit 318 executes gamma correction processing for a transparent toner, which is optimum when output by the MFPs 101 and 103, on the converted single-color signal having one color component. In step S2504, the CPU of the MFP control unit 318 executes image formation processing for generating a transparent toner image. The parameters for the gamma correction processing and the image formation processing different from those used for processing CMYK image data-dependent type image data may be used in processing transparent image data.

Now, an exemplary flow of processing executed for performing the one-pass printing method, which is mainly used in the present exemplary embodiment, will be described in detail below with reference to FIG. 20. Processing in step S2003 and subsequent steps illustrated in FIG. 20 is implemented and executed by the CPU (not illustrated) of the MFP control unit 318.

Referring to FIG. 20, in step S2001, the user designates transparent image data to be used via the UI from among image data stored on the registered image storage unit 319A.

In step S2002, the user designates a print setting for the CMYK image data via the UI, and starts a print job. In the present exemplary embodiment, the "print setting" includes settings of various layout processing for setting the layout in outputting CMYK image data, such as rotation processing, enlargement and reduction processing, image reversal processing, negative-positive inversion processing, or N-in-1 composition processing (page layout processing).

It is useful to use the UI illustrated in FIG. 12 as an example of the UI used in steps S2001 and 2002. If the UI illustrated in FIG. 12 is used, the user can appropriately select the content of the print setting and designate the name of transparent image data at the same time.

In the present exemplary embodiment, it is also useful if the following method is used. More specifically, in this case, the CPU of the MFP control unit 318 collates an image generated based on the transparent image data designated by the user with an image generated based on the CMYK image data. If it is determined that the shapes of the images are the same, then the CPU of the MFP control unit 318 determines that the image type of the transparent image data designated by the user is the "CMYK image data-dependent type image data".

In this case, the CPU of the MFP control unit 318 can automatically determine the image type by executing the image collation processing on the image processing apparatus even if the user has not selected the image type during registration of the transparent image data. Then, the processing proceeds to step S2003.

In step S2003, the print setting table processing unit 318D generates a CMYK image data print setting table. More specifically, the CMYK image data print setting table stores the print setting and the parameter values set in step S2002.

FIG. 9 illustrates an example of the CMYK image data print setting table. The CMYK image data print setting table includes various setting items, such as a CMYK image data file name, a transparent image data file name, a job transmission source user name, a job start date and time, and a layout setting content. For the layout setting content, the processing content and a parameter value therefor, such as "Enlargement/Reduction: 70%" and "Reversal: ON", are described.

In step S2004, the print setting table processing unit 318D refers to the CMYK image data print setting table including the layout setting. Furthermore, in step S2004, the CPU of the MFP control unit 318 determines whether to execute image processing, such as rotation and enlargement or reduction. If it is determined that the image processing is to be executed (Yes in step S2004), then the processing proceeds to step S2005. On the other hand, if it is determined that the image processing is not to be executed (No in step S2004), then the processing proceeds to step S2006.

In step S2005, the CPU of the MFP control unit 318 executes the image processing, such as rotation, enlargement, or reduction on the CMYK image data. More specifically, the print setting table processing unit 318D refers to the print setting table to acquire the processing content and the parameter values set for each designated image processing. Furthermore, the print setting table processing unit 318D transmits the acquired processing content and parameter values to the rotation/enlargement/reduction/reversal processing unit 318C.

The rotation/enlargement/reduction/reversal processing unit 318C executes image processing, such as rotation, enlargement, or reduction on the CMYK image data according to the received parameter value. The image processing, such as rotation, enlargement, or reduction executed in step S2005 is executed in the manner described above with reference to FIG. 7.

As described above, in the present exemplary embodiment, the CPU of the MFP control unit 318 executes the image processing according to the layout setting acquired from the print setting table. Image processing to be executed during printing of the transparent image data (the second image data) is determined according to the image processing executed on the CMYK image data in step S2005. Then, the processing proceeds to step S2006. In step S2006, the output image processing unit 320 executes image processing that has been designated to be executed uniquely and particularly on CMYK image data. The processing in step S2006 is executed in the manner described above with reference to FIG. 24.

In step S2007, the print setting table processing unit 318D associates the CMYK image data print setting table with the transparent image data to be used, and stores the mutually associated CMYK image data print setting table and transparent image data on the print setting table storage unit 319B. By executing the processing in step S2007, the CMYK image data and the transparent image data to be used is mutually associated. Then, the processing proceeds to step S2008.

In step S2008, the print setting table application determination unit 318A determines whether the transparent image data to be processed is the CMYK image data-dependent type image data. The determination in step S2008 can be made according to the image type registered by the user in step S1802 (FIG. 18) or S1902 (FIG. 19). Alternatively, it is also useful if the determination in step S2008 is made according to the image type automatically determined when the transparent image data is registered.

If it is determined that the transparent image data to be processed is the CMYK image data-dependent type image data (Yes in step S2008), then the processing proceeds to step S2009. On the other hand, if it is determined that the transparent image data to be processed is the watermark type image data (No in step S2008), then the processing proceeds to step S2010. More specifically, if it is determined that the transparent image data to be processed is the CMYK image data-dependent type image data (Yes in step S2008), then the print setting table application determination unit 318A transmits the result of the determination to the print setting table processing unit 318D. In addition, in this case, the CPU of the MFP control unit 318 executes control for applying the layout setting, which has been set for the print setting for printing CMYK image data, on the transparent image data.

To paraphrase this, in step S2009, the CPU of the MFP control unit 318 executes processing for determining an image to which the parameter value stored in the CMYK image data print setting table is to be applied by using the CMYK image data print setting table storing the layout setting set in the above-described manner. On the other hand, if it is determined that the transparent image data to be processed is the watermark type image data (No in step S2008), then the CPU of the MFP control unit 318 does not change the print setting, and proceeds to the image processing to be executed on the transparent image data.

In step S2009, the registered image processing unit 318B reads the transparent image data to be used in the designated printing from the registered image storage unit 319A. In addition, in step S2009, the print setting table processing unit 318D reads the CMYK image data print setting table from the print setting table storage unit 319B. Furthermore, the print setting table processing unit 318D refers to the print setting table to acquire the processing content and the parameter values. Furthermore, the print setting table processing unit 318D transmits the acquired processing content and parameter values to the rotation/enlargement/reduction/reversal processing unit 318C. The rotation/enlargement/reduction/reversal processing unit 318C executes image processing, such as rotation, enlargement, or reduction on the transparent image data according to the received parameter value. Then, the processing proceeds to step S2010.

In step S2010, the output image processing unit 320 executes image processing that has been designated to be executed uniquely and particularly on transparent image data. The processing in step S2010 is executed in the manner described above with reference to FIG. 25. In step S2011, the CPU of the MFP control unit 318 executes processing for generating print data based on the CMYK image data and the transparent image data. Then, the printer unit 321 executes printing of the print data. Then the processing ends.

As described above, in the present exemplary embodiment, in executing one-pass printing of print data generated based on CMYK image data and transparent image data, the user previously designates the image type of the transparent image data when registering the same on the image processing apparatus. Accordingly, the present exemplary embodiment can execute appropriate processing according to a result of automatic determination as to whether to apply the print setting used for processing CMYK image data on the transparent image data.

In the present exemplary embodiment, an image generated by using the transparent toner is superposed on an image generated by using the CMYK toners. However, the present exemplary embodiment is not limited to this. More specifically, it is also useful if an image generated by using the transparent toner is superposed on an image generated by using a single-color toner having one color component, such as the K toner. In addition, it is also useful if images generated by using special color toners, such as red, green, blue, purple, orange, gold, or silver toners, are superposed with one another.

It is also useful if an image of the first image data is generated by using red, green, blue toners, and an image of the second image data is generated by using transparent and silver toners, and if the images are superposed with one another. More specifically, in the present exemplary embodiment, the number of colors used to generate an image of each image data is not limited to a specific number. In addition, in the present exemplary embodiment, the transparent toner is used. However, it is also useful if a transparent ink is used. Similarly, it is also useful if a transparent ink, which is a special color ink, is used instead of the above-described special color toners.

Now, a second exemplary embodiment of the present invention will be described in detail below. In the above-described first exemplary embodiment, the one-pass printing method is executed, in which images of CMYK image data and an image of the transparent image data are printed at the same time. In the present exemplary embodiment, the two-pass printing method is executed, in which images of CMYK image data and an image of the transparent image data are printed in two passage operations separately for the CMYK toner image data and the transparent toner image data.

In the present exemplary embodiment, the two-pass printing method is executed in the following manner. More specifically, for the first passage operation, the first image data is printed by using the CMYK toners. A resulting print product is used as a preprint sheet. In addition, for the second passage operation, the preprint sheet is set in the printer (MFP) via a sheet feeding port. Then, the second image data is printed by using the transparent toner.

Now, an exemplary flow of the two-pass printing method according to the present exemplary embodiment will be described in detail below with reference to FIGS. 21 and 22. In the present exemplary embodiment, units, components, and processing similar to those described above in the first exemplary embodiment are provided with the same reference numerals and symbols. Accordingly, the description thereof will not be repeated here.

Figure 21:
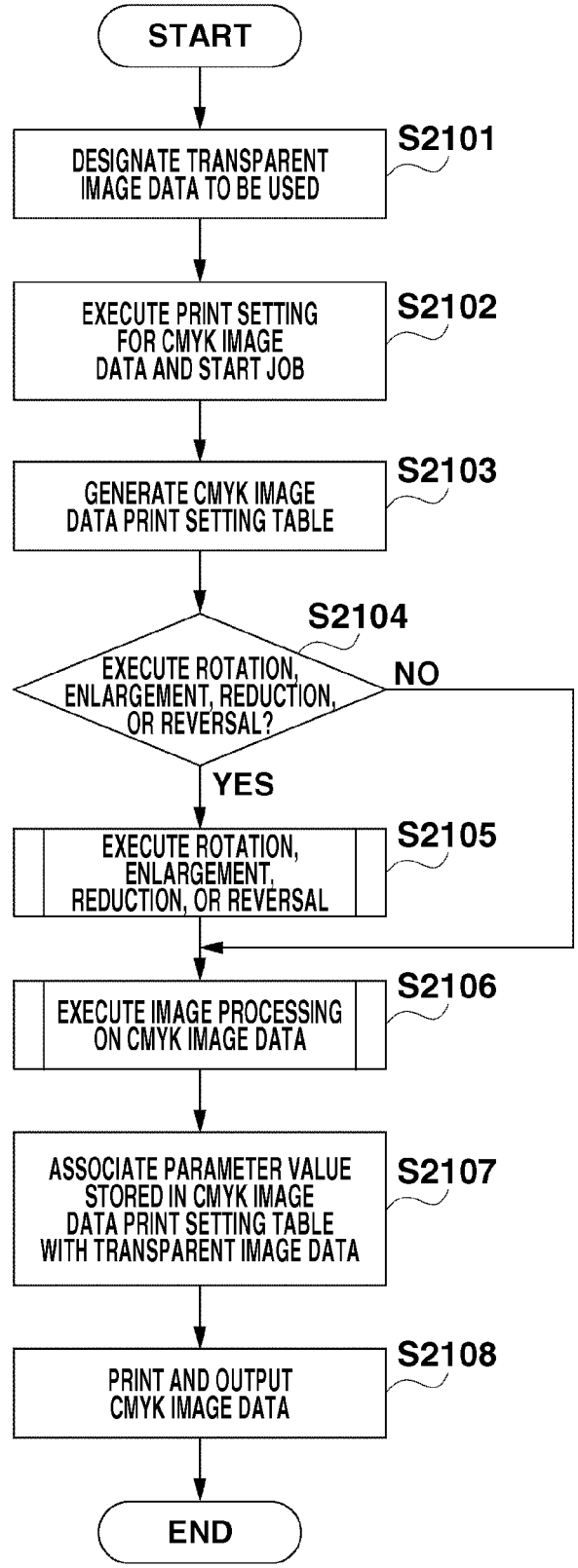
FIG. 21 is a flow chart schematically illustrating an example of CMYK image data printing processing.

FIG. 21 is a flow chart illustrating an example of the first passage printing processing according to the present exemplary embodiment. Processing in step S2103 and subsequent steps illustrated in FIG. 21 is implemented and executed by the CPU (not illustrated) of the MFP control unit 318.

Referring to FIG. 21, in step S2101, the user designates transparent image data to be used via the UI, from among the image data stored on the registered image storage unit 319A. Then, the processing proceeds to step S2102. In step S2102, the user designates a print setting of the image processing to be executed on the CMYK image data, such as rotation, enlargement, or reduction, via the UI, and starts a print job. Similar to the first exemplary embodiment, it is also useful in the present exemplary embodiment to use the UI illustrated in FIG. 12 as an example of the UI to be used in steps S2101 and 2102. Then, the processing proceeds to step S2103.

In step S2103, the print setting table processing unit 318D generates a CMYK image data print setting table (FIG. 9), which stores the print setting including the layout setting and the parameter value set in step S2102. Then, the processing proceeds to step S2104.

In step S2104, the print setting table processing unit 318D refers to the CMYK image data print setting table including the layout setting. Furthermore, in step S2104, the CPU of the MFP control unit 318 determines whether to execute image processing, such as rotation and enlargement or reduction. If it is determined that the image processing is to be executed (Yes in step S2104), then the processing proceeds to step S2105. On the other hand, if it is determined that the image processing is not to be executed (No in step S2104), then the processing proceeds to step S2106.

In step S2105, the CPU of the MFP control unit 318 executes the image layout processing, such as rotation, enlargement, or reduction on the CMYK image data. More specifically, the print setting table processing unit 318D refers to the print setting table to acquire the processing content and the parameter values set for each designated image processing. Furthermore, the print setting table processing unit 318D transmits the acquired processing content and parameter values to the rotation/enlargement/reduction/reversal processing unit 318C.

The rotation/enlargement/reduction/reversal processing unit 318C executes image processing, such as rotation, enlargement, or reduction on the CMYK image data according to the received parameter value. The image processing, such as rotation, enlargement, or reduction executed in step S2105 is executed in the manner described above with reference to FIG. 7. Then, the processing proceeds to step S2106. In step S2106, the output image processing unit 320 executes image processing that has been designated to be executed uniquely and particularly on CMYK image data. The processing in step S2106 is executed in the manner described above with reference to FIG. 24.

In step S2107, the print setting table processing unit 318D associates the CMYK image data print setting table with the transparent image data to be used and stores the mutually associated CMYK image data print setting table and transparent image data on the print setting table storage unit 319B. By executing the processing in step S2107, the CMYK image data and the transparent image data to be used is mutually associated. Then, the processing proceeds to step S2108.

In step S2108, the printer unit 321 executes printing of the CMYK image data. Then, the first passage printing operation ends. By executing the first passage printing operation described above, a preprint sheet, on which images of the CMYK image data have been printed, can be obtained.

Now, an example of the second-passage printing operation will be described in detail below with reference to FIG. 22.

Figure 22:
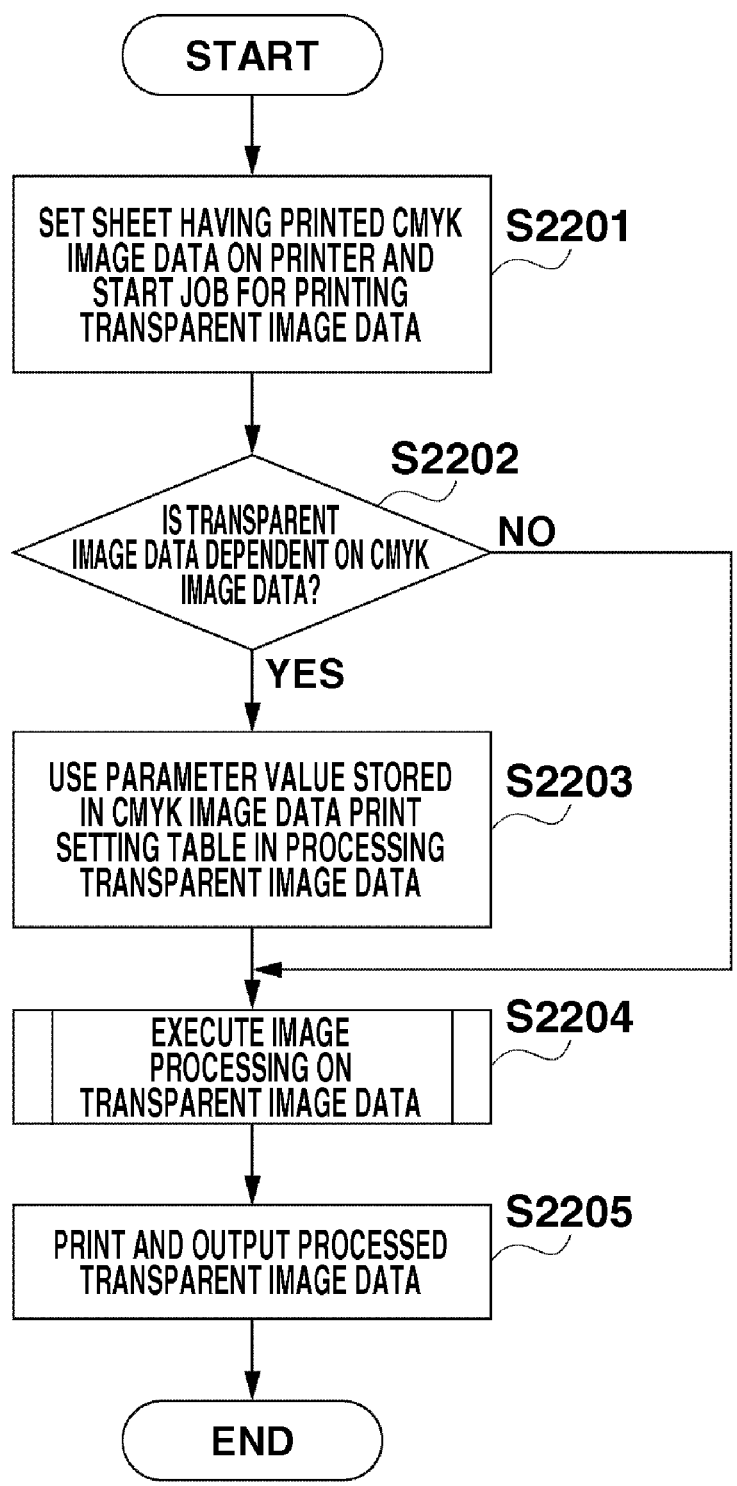
FIG. 22 is a flow chart schematically illustrating an example of transparent image data printing processing.

Referring to FIG. 22, in step S2201, the user feeds the preprint sheet having the CMYK images printed thereon, which have been printed by the first passage printing operation, into the image processing apparatus again. By using the preprint sheet, the image processing apparatus starts the printing of the transparent image data.

In the present exemplary embodiment, it is also useful if a verification UI screen, which is displayed when a preprint sheet is set and until a job is started, is used. By using the UI screen illustrated in FIG. 13, the present exemplary embodiment can execute the second passage printing operation without erroneously using a wrong combination of CMYK image data and transparent image data.

In step S2202, the print setting table application determination unit 318A determines whether the transparent image data to be processed is the CMYK image data-dependent type image data. The determination in step S2202 can be made according to the image type registered by the user in step S1802 (FIG. 18) or S1902 (FIG. 19). Alternatively, it is also useful if the determination in step S2202 is made according to the image type automatically determined when the transparent image data is registered.

If it is determined that the transparent image data to be processed is the CMYK image data-dependent type image data (Yes in step S2202), then the processing proceeds to step S2203. On the other hand, if it is determined that the transparent image data to be processed is the watermark type image data (No in step S2202), then the processing proceeds to step S2204.

More specifically, if it is determined that the transparent image data to be processed is the CMYK image data-dependent type image data (Yes in step S2008), then the print setting table application determination unit 318A transmits the result of the determination to the print setting table processing unit 318D. In addition, in this case, the CPU of the MFP control unit 318 executes control for applying the layout setting, which has been set for the print setting for printing CMYK image data, on the transparent image data. To paraphrase this, the CPU of the MFP control unit 318 executes the setting same as the setting set in the layout setting included in the print setting for the CMYK image data.

On the other hand, if it is determined that the transparent image data to be processed is the watermark type image data (No in step S2202), then the CPU of the MFP control unit 318 does not change the print setting, and proceeds to the image processing to be executed on the transparent image data.

In step S2204, the registered image processing unit 318B reads the transparent image data to be used in the designated printing from the registered image storage unit 319A. In addition, in step S2203, the print setting table processing unit 318D reads the CMYK image data print setting table from the print setting table storage unit 319B.

Furthermore, the print setting table processing unit 318D refers to the print setting table including the layout setting to acquire the processing content and the parameter values. Furthermore, the print setting table processing unit 318D transmits the acquired processing content and parameter values to the rotation/enlargement/reduction/reversal processing unit 318C. The rotation/enlargement/reduction/reversal processing unit 318C executes image processing, such as rotation, enlargement, or reduction on the transparent image data according to the received parameter value. Then, the processing proceeds to step S2204.

In step S2204, the output image processing unit 320 executes image processing that is executed uniquely and particularly on transparent image data. The processing in step S2010 is executed in the manner described above with reference to FIG. 25. In step S2205, the printer unit 321 executes printing of the transparent image data. Then the processing ends.

As described above, in executing the two-pass printing method, the present exemplary embodiment stores the image type of the transparent image data designated by the user in registering the transparent image data. With the above-described configuration, the present exemplary embodiment can automatically execute appropriate processing on the transparent image data, and print the appropriately processed transparent image data.

In the present exemplary embodiment, the same printer executes printing of CMYK image data and printing of transparent image data. However, the present exemplary embodiment is not limited to this. More specifically, it is also useful if the MFP (first image processing apparatus) 101 prints the CMYK image data while the MFP (second image processing apparatus) 103 separately prints the transparent image data.

In this case, it is also useful if the CPU of the MFP control unit 318 transmits the CMYK image data print setting table, which has been generated on the MFP 101, and transparent image data that has been associated with the CMYK image data print setting table, to the MFP 103. The MFP 103 stores the received CMYK image data print setting table and transparent image data. After storing the same, the MFP 103 acquires the image type of the transparent image data by referring to the CMYK image data print setting table. In addition, the CPU of the MFP control unit 318 of the MFP 103 executes printing of the transparent image data on the preprint sheet having the CMYK image data printed thereon.

Now, a third exemplary embodiment of the present invention will be described in detail below. In the above-described first and the second exemplary embodiments of the present invention, the print setting table application determination unit 318A automatically determines whether to apply the layout setting included in the print setting set for the CMYK image data on the transparent image data.

Figure 5A:
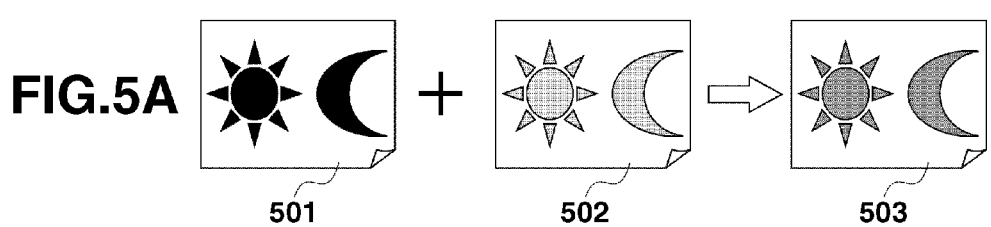
FIGS. 5A through 5E illustrate an example of a method for superposing transparent image data on CMYK image data.
Figure 5B:
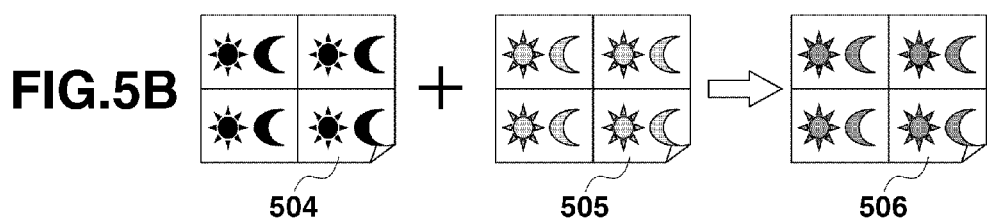
Figure 5C:
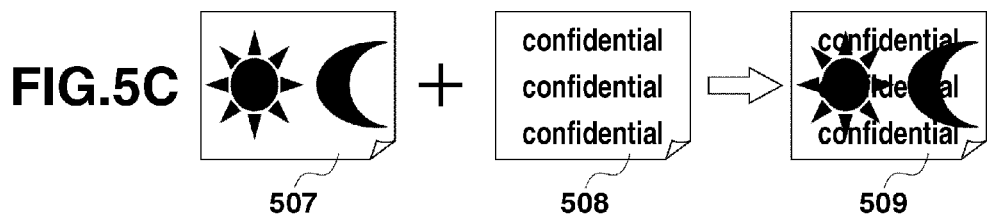
Figure 5D:
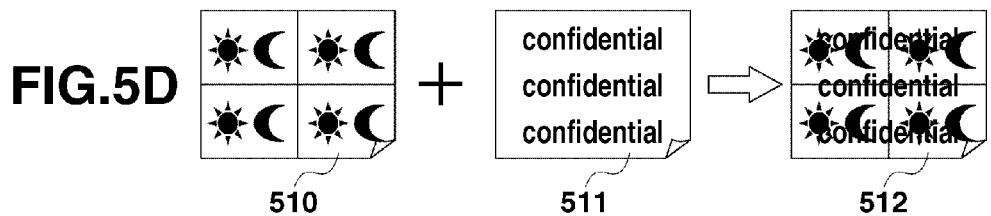
Figure 5E:
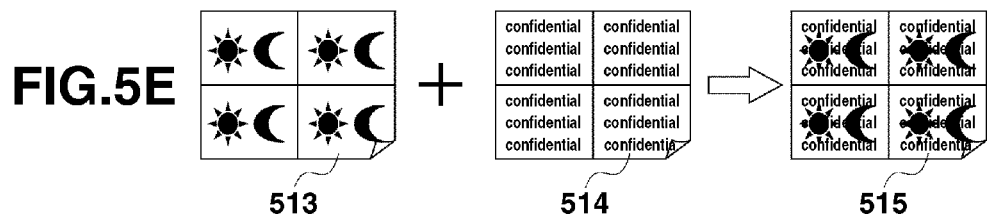

However, the result of the automatic determination may not always satisfy the user's purpose of use of the image. Suppose that the transparent image data corresponding to CMYK image data 513 (FIG. 5E), which has a 4-in-1 layout, is to be processed.

In this case, if the user desires to obtain a print product such as an output image 515 when the image type of the registered transparent image data is the watermark type, it is necessary that the layout setting included in the print setting set for the CMYK image data is applied to the transparent image data, and generate transparent image data 514 having a 4-in-1 layout as the CMYK image data 513. In the present exemplary embodiment, the user can verify whether to apply the print setting set for the CMYK image data to the transparent image data.

Figure 23:
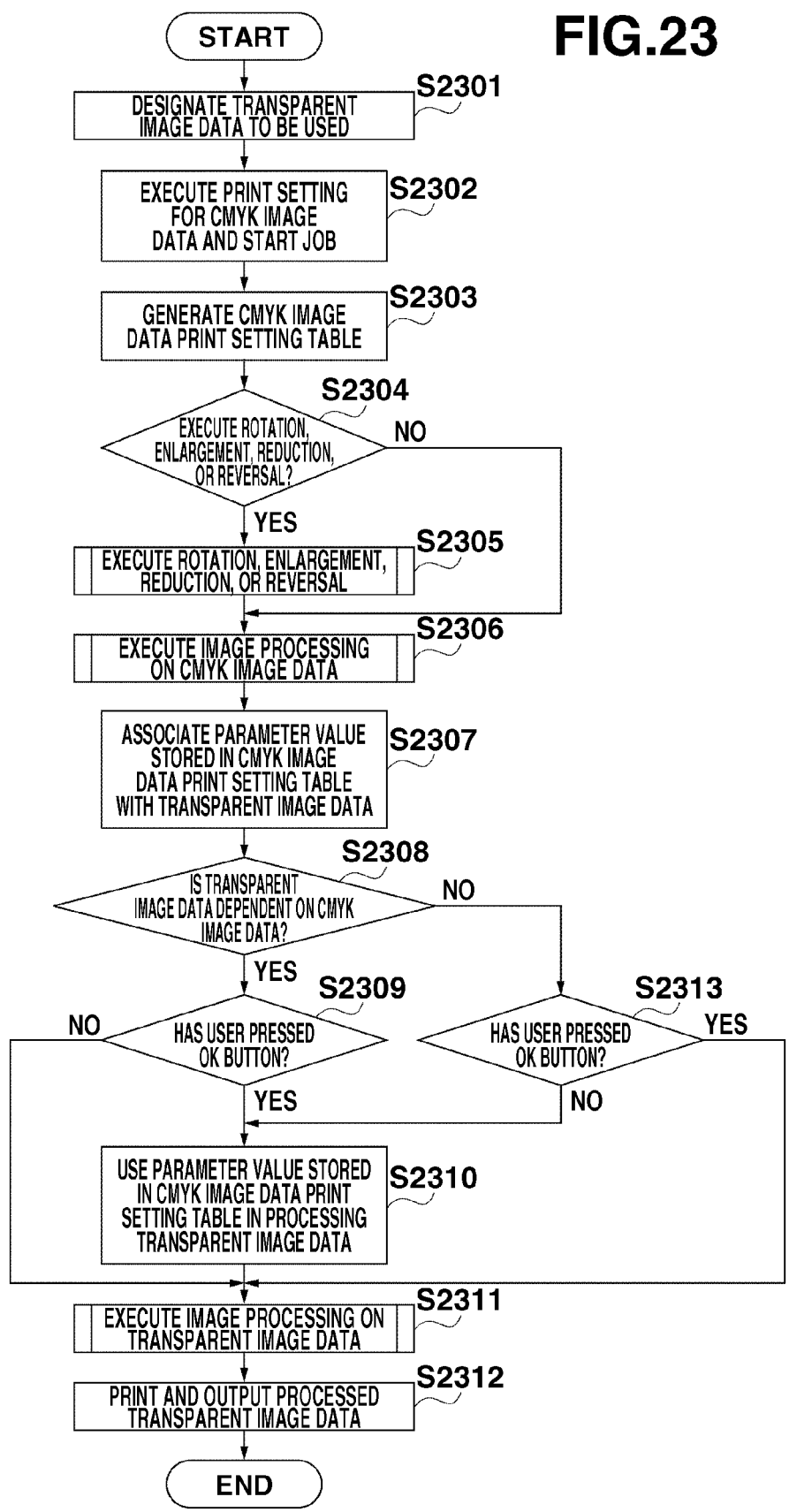
FIG. 23 is a flow chart schematically illustrating an example of processing according to a third exemplary embodiment of the present invention.

FIG. 23 is a flow chart illustrating an example of processing according to the present exemplary embodiment, which is implemented in executing the one-pass printing method.

The processing from steps S2301 through S2307 is similar to that in steps S2001 through S2007 illustrated in FIG. 20 and described above in the first exemplary embodiment. Accordingly, the description thereof will not be repeated here. Processing in step S2303 and subsequent steps illustrated in FIG. 23 is implemented and executed by the CPU (not illustrated) of the MFP control unit 318.

Referring to FIG. 23, in step S2308, the print setting table application determination unit 318A determines whether the transparent image data to be processed is the CMYK image data-dependent type image data. If it is determined that the transparent image data to be processed is the CMYK image data-dependent type image data (Yes in step S2308), then the processing proceeds to step S2309. On the other hand, if it is determined that the transparent image data to be processed is the watermark type image data (No in step S2308), then the processing proceeds to step S2313.

More specifically, in the present exemplary embodiment, if it is determined that the transparent image data to be processed is the CMYK image data-dependent type image data (Yes in step S2308), then the CPU of the MFP control unit 318 applies the layout setting included in the print setting set for the CMYK image data. On the other hand, if it is determined that the transparent image data to be processed is the watermark type image data (No in step S2308), then the CPU of the MFP control unit 318 does not change the layout setting, and proceeds to the image processing to be executed on the transparent image data.

In step S2309, the CPU of the MFP control unit 318 generates a display screen for prompting the user to determine whether to apply the print setting for the CMYK image data to the transparent image data. More specifically, the CPU of the MFP control unit 318 displays the result of the determination and prompts the user to determine whether to apply the print setting for the CMYK image data to the transparent image data. If the user desires to apply the print setting for the CMYK image data to the transparent image data (Yes in step S2309), then the processing proceeds to step S2310. On the other hand, if the user does not desire to apply the print setting for the CMYK image data to the transparent image data (No in step S2309), then the processing proceeds to step S2311.

In step S2313, the CPU of the MFP control unit 318 displays a UI screen for prompting the user to determine whether the user surely does not desire to apply the print setting for the CMYK image data to the transparent image data. If the user is sure not to apply the layout setting set for the CMYK image data to the transparent image data (Yes in step S2313), then the processing proceeds to step S2311. On the other hand, if the user desires to apply the print setting for the CMYK image data to the transparent image data (No in step S2313), then the processing proceeds to step S2310.

FIG. 14 illustrates an example of the UI used in step S2309 or S2313. It is useful if the UI screen displayed in step S2309 or S2313 includes a button (soft key) for designating the application of the print setting according to items, such as a transparent image data file name and the content of the print setting.

In step S2310, similar to the processing in step S2009 (FIG. 20), the CPU of the MFP control unit 318 executes control for performing the image processing, such as rotation, enlargement, or reduction on the transparent image data. In step S2311, similar to the processing in step S2010 (FIG. 20), the CPU of the MFP control unit 318 executes control for performing image processing to be exclusively and particularly executed on the transparent image data. In step S2312, the printer unit 321 executes the print processing. Then the processing ends.

As described above, in the present exemplary embodiment, the CPU of the MFP control unit 318 allows the user to determine whether to apply the layout setting for the CMYK image data to the transparent image data before it is actually applied. With the above-described configuration, the present exemplary embodiment can allow the user to obtain a print product appropriate to the user's purpose of use of the printing target image. In the present exemplary embodiment, the flow of processing executed in performing the one-pass printing method is described. However, the present exemplary embodiment can be used in performing the two-pass printing method.

Now, a fourth exemplary embodiment of the present invention will be described in detail below. In the present exemplary embodiment, a plurality of determination modes are provided for determining whether to apply the print setting so that the user can designate whether to apply the print setting before actually applying the same. FIG. 16 illustrates an example of a UI according to the present exemplary embodiment.

The plurality of determination modes according to the present exemplary embodiment can include the following modes. More specifically, a mode can be used that automatically determines whether to apply the layout setting for the CMYK image data to the transparent image data. In addition, another mode can be used that allows the user to determine whether to apply the layout setting for the CMYK image data to the transparent image data. Furthermore, it is useful if the plurality of modes includes a mode for always applying the layout setting for the CMYK image data to the transparent image data. On the other hand, it is also useful if the plurality of modes includes a mode for always not applying the layout setting for the CMYK image data to the transparent image data. To paraphrase this, in the present exemplary embodiment, the user is allowed to previously select either one of the above-described modes.

In the present exemplary embodiment, the mode set by the user via the UI is set as a condition for the determination by the print setting table application determination unit 318A. More specifically, if the automatic determination mode has been selected by the user, whether to apply the layout setting is determined according to the image type of the transparent image data. On the other hand, if the mode for allowing the user to determine whether to apply the layout setting to the transparent image data has been selected, then the CPU of the MFP control unit 318 displays the result of the determination by the print setting table application determination unit 318A on the UI to prompt the user to determine.

Furthermore, if the mode for always applying the layout setting to the transparent image data has been selected by the user, then the CPU of the MFP control unit 318 executes the setting for always applying the parameter values stored in the print setting table. On the other hand, if the mode for always not applying the layout setting to the transparent image data has been selected by the user, then the CPU of the MFP control unit 318 executes the setting opposite to the above-described setting.

The result of the determination by the print setting table application determination unit 318A is transmitted to the print setting table processing unit 318D. Accordingly, the processing is executed according to the layout setting included in the print setting table. After that, the processing similar to that in the first and the second exemplary embodiments is executed.

As described above, by using the mode changing function of the present exemplary embodiment, the present invention can change the processing to be executed on transparent image data according to the user's purpose of use of the resulting print product.

Now, a fifth exemplary embodiment of the present invention will be described in detail below. In the present exemplary embodiment, a plurality of pieces of image data used for executing the second passage printing operation is transmitted to the same image processing apparatus. More specifically, suppose, similarly to the second exemplary embodiment, that the print setting table for the CMYK image data, which has been used in the first passage printing operation during a two-pass print job, and a plurality of pieces of transparent image data associated with the print setting table have been transmitted to the same image processing apparatus.

In this case, the user may be confused as to which preprint sheet printed by the first passage printing operation corresponds to which transparent image data for the second passage printing operation. In the present exemplary embodiment, a "print job" is a unit of processing executed by the printing apparatus and includes a series of processing operations executed by the printing apparatus.

In the present exemplary embodiment, as illustrated in FIG. 15, a list of print jobs of image data to be used by the second passage printing operation is displayed on the UI. More specifically, the print job list can include the printing time taken for the first passage printing operation, the name of the user who has input the print job for the first passage printing operation and instructed the start of the first passage printing operation, the name of the CMYK image data (the name of the first image data), the name of the transparent image data (the name of the second image data), and a preview of the image to be printed by the second passage printing operation.

In each job displayed in the list, the transparent image data is previously stored on the registered image storage unit 319A. In addition, the print setting table linked with the transparent image data stored on the registered image storage unit 319A is stored on the print setting table storage unit 319B.

In addition, the transparent image data is previously registered together with its image type as described above in the first exemplary embodiment. Under these conditions, if a specific job is selected by the user, then the CPU of the MFP control unit 318 executes control for reading the transparent image data from the registered image storage unit 319A and the print setting table corresponding thereto from the print setting table storage unit 319B.

Then, the registered image storage unit 319A executes whether to apply the layout setting included in the print setting table. In addition, the result of the determination is transmitted to the print setting table processing unit 318D. Then, the processing for applying the layout setting is executed. A job whose second passage printing operation has been completely executed is deleted from the job list.

As described above, by executing the method according to the present exemplary embodiment, the user is allowed, in two-pass printing CMYK image data and transparent image data, to select a desired job from among those included in the job list and appropriately start printing thereof without erroneously setting the print setting.

Now, a sixth exemplary embodiment of the present invention will be described in detail below. In the present exemplary embodiment, it is supposed that a plurality of jobs to be two-pass printed is input to the same MFP. In the present exemplary embodiment, if a plurality of two-pass print job is input, in order to prevent starting printing of a wrong job, the CPU of the MFP control unit 318 executes control for setting and waiting during a wait time from a timing at which a preprint sheet corresponding to a two-pass print job is set through the sheet feed port to a timing of start of the printing.

If the wait time of five minutes has been set, for example, the CPU of the MFP control unit 318 executes control not for receiving another job for executing a "first passage printing operation of a two-pass print job" for five minutes. The wait time is counted by using a timer (not illustrated) provided within the MFP control unit 318. During the wait time, a UI screen illustrated in FIG. 17 is displayed by the operation unit 317.

More specifically, the UI screen illustrated in FIG. 17 includes various items, such as the name of the transparent image data to be subsequently printed, the job start date and time, the name of the user who has input the job, the print setting to be applied, and the remaining wait time. It is also useful if a preview image of a resulting print product is displayed on the UI screen illustrated in FIG. 17. If a preprint sheet is set during the wait time of five minutes, then the CPU of the MFP control unit 318 executes the processing described above with reference to FIG. 22, and resets the timer.

After that, the MFP control unit 318 resumes normally receiving a job. On the other hand, if the job of the second passage printing operation is not started after the wait time of five minutes has elapsed, then the MFP control unit 318 resets the timer, discontinues the display on the UI screen illustrated in FIG. 17, and resumes normally receiving a job.

With the above-described configuration, in executing two-pass printing of CMYK image data and transparent image data, the present exemplary embodiment can prevent printing of another image data during a time period between the first passage printing operation and the second passage printing operation. Accordingly, the present exemplary embodiment can print the transparent image data appropriately corresponding to the content of and setting set for the image printed on preprint sheet.

Now, a seventh exemplary embodiment of the present invention will be described in detail below. In the present exemplary embodiment, it is supposed that in executing one-pass printing or two-pass printing, the transparent image data includes data of a plurality of pages. The processing executed according to the present exemplary embodiment will be described in detail below with reference to FIG. 6.

Figure 6:
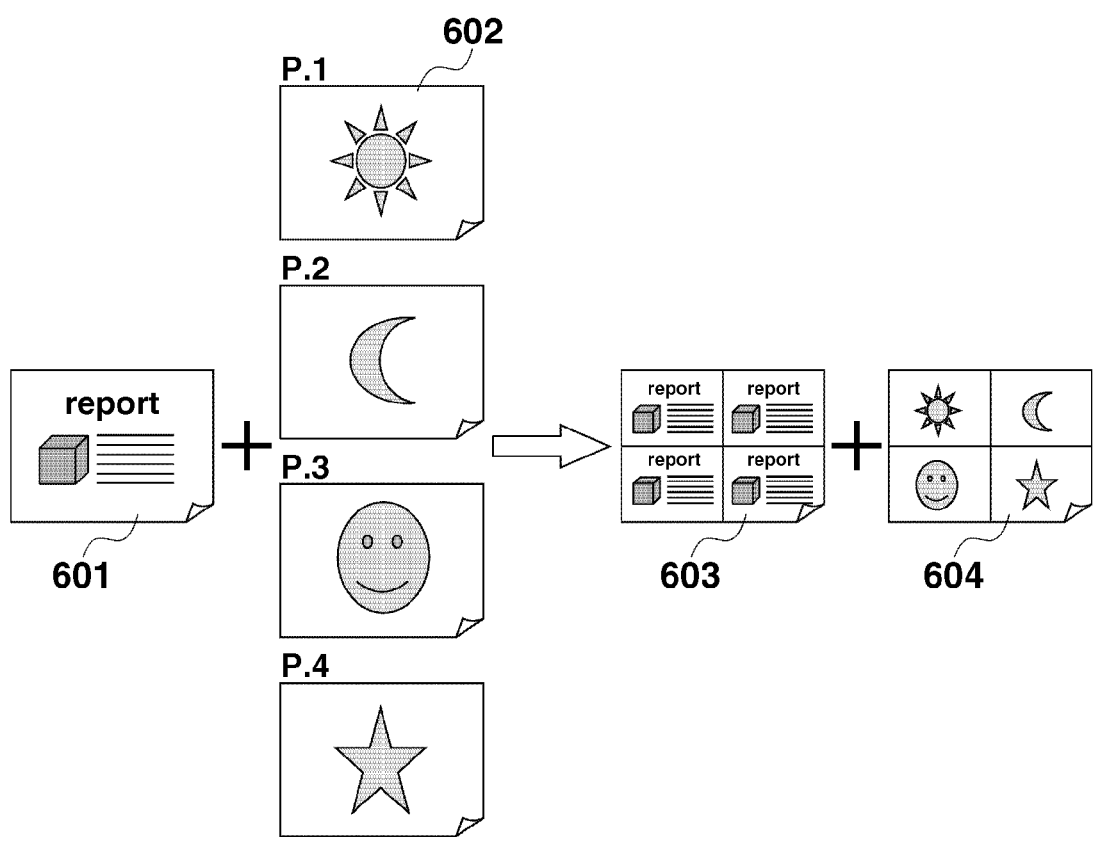
FIG. 6 illustrates an example of a print setting executed in printing transparent image data of a plurality of pages.

Referring to FIG. 6, it is supposed in the present exemplary embodiment that CMYK image data 601 has a 4-in-1 layout and transparent image data 602, which includes transparent image data of a plurality of pages, is printed in superposition on the CMYK image data 601. It is not necessary that the transparent image data of the plurality of pages have the same content. It is only necessary that the transparent image data of the plurality of pages is allocated for the CMYK image data.

If the transparent image data 602 includes data of a plurality of pages, it is expected that the user desires to print the image data of the plurality of pages, which has the 4-in-1 layout similar to the 4-in-1 layout of each page of CMYK image data 603. Accordingly, in the present exemplary embodiment, the CPU of the MFP control unit 318 compulsorily applies the layout setting included in the print setting table for the CMYK image data to the transparent image data even if the transparent image data has been registered as the watermark type image data.

In the present exemplary embodiment, it is useful if a UI screen illustrated in FIG. 11 is displayed when registering the transparent image data. More specifically, the UI screen having a plurality of stages indicating the image type of transparent image data, which are intermediate stages between the "CMYK image data-dependent type image data" and the watermark type image data, can be used.

In this case, if transparent image data has been registered as having the image type "2", then the present exemplary embodiment executes control for providing the transparent image data with the 4-in-1 layout. On the other hand, if transparent image data has been registered as having the image type other than the image type "2", then the present exemplary embodiment executes control not for applying the layout setting for the CMYK image data-dependent type image data. Accordingly, with the above-described configuration, the present exemplary embodiment can optimally change and execute the method for processing the transparent image data. Alternatively, it is also useful if the CPU of the MFP control unit 318 always executes control for prompting the user to determine the method for processing the transparent image data before actually executing the processing on the transparent image data if the user has registered the transparent image data as having the image type "3", for example.

Now, an eighth exemplary embodiment of the present invention will be described in detail below. In the present exemplary embodiment, it is supposed that transparent image data has already been registered after being subjected to image editing processing, such as rotation, enlargement, or reduction. Suppose, during the processing according to the first exemplary embodiment, that the transparent image data is provided with a 4-in-1 layout, and stored on the registered image storage unit 319A.

In this case, the CPU of the MFP control unit 318 registers the image type of the transparent image data together with the content of the above-described image editing processing (i.e., the 4-in-1 layout setting processing) on the print setting table storage unit 319B as an image editing setting table.

In the present exemplary embodiment, in printing the CMYK image data-dependent type image data, the print setting table application determination unit 318A acquires the image type of the transparent image data to be used. In addition, the print setting table application determination unit 318A collates the layout setting stored in the print setting table for the CMYK image data-dependent type image data with the setting stored in the transparent image editing setting table. In this case, if it is determined that the print setting stored in the print setting table for the CMYK image data-dependent type image data does not match the print setting included in the image editing setting table (i.e., if printing in normal size has been set exclusively for the CMYK image data-dependent type image data), then the rotation/enlargement/reduction/reversal processing unit 318C executes the print processing after converting the size of the transparent image data back to its normal size.

To paraphrase this, in the present exemplary embodiment, the CPU of the MFP control unit 318 executes control of the rotation/enlargement/reduction/reversal processing unit 318C for executing inverse transform on the image data that has been reduced by the setting of the 4-in-1 layout according to the layout setting set for the registered transparent image data to convert the size of the transparent image data back to its normal size.

With the above-described configuration, the present exemplary embodiment can convert the registered transparent image data according to the layout setting set for the CMYK image data-dependent type image data according to the image type of the transparent image data even if the registered transparent image data has been previously edited.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-135311 filed Jun. 4, 2009, which is hereby incorporated by reference herein in its entirety.

What is claimed is:

1. An image processing apparatus comprising:
   a setting unit configured to execute a layout setting on first image data;
   a determination unit configured to determine an image type of second image data;
   an image processing unit configured, if it is determined, as a result of determination by the determination unit, that the image type of the second image data is an image type for applying a layout setting set for the first image data, to execute image processing on the second image data according to the layout setting set for the first image data, and if it is determined, as a result of determination by the determination unit, that the image type of the second image data is an image type for not applying a layout setting set for the first image data, the image processing unit is configured not to execute image processing on the second image data according to the layout setting set for the first image data; and
   an output unit configured to form an image of the first image data that has been processed according to the layout setting set by the setting unit, to output the first image data on a printing sheet by using color toners, to form an image of the second image data that has been processed by the image processing unit, and to output the second image data on the printing sheet by using a transparent toner.

2. The image processing apparatus according to claim 1, further comprising a preprint sheet acquisition unit configured to obtain a preprint sheet having the image of the first image data printed thereon according to the layout setting set by the setting unit, wherein the output unit is configured to output print data for printing the second image data that has been image-processed according to the layout setting set by the setting unit on the preprint sheet.

3. The image processing apparatus according to claim 2, wherein the image processing apparatus is configured to be in communication with another image processing apparatus including a unit configured to receive the second image data and the layout setting set by the setting unit, and to print an image of the second image data, which has been processed according to the layout setting, on the preprint sheet.

4. The image processing apparatus according to claim 1, wherein the determination unit includes a unit configured to generate a display screen that allows a user to select whether to apply a result of the determination by the determination unit, and only if the user selects to apply the determination result, the layout setting is applied to processing of the second image data.

5. The image processing apparatus according to claim 1, wherein the image type of the second image data is designated by a user.

6. The image processing apparatus according to claim 1, wherein if a plurality of pieces of first image data, which can be combined with the second image data, is input to the image processing apparatus, a list is displayed, which includes at least one of a printing time of the first image data, a name of the user who has printed the first image data, a name of the first image data, a name of the second image data, and a preview of an image printed after the first image data and the second image data is combined.

7. The image processing apparatus according to claim 2, wherein a print instruction for printing another image data is not accepted after printing the first image data and until a timing of receiving an instruction for printing the second image data after the preprint sheet is fed.

8. The image processing apparatus according to claim 1, wherein if the second image data includes data of a plurality of pages, the layout setting used for the first image data is also used in processing the second image data, which includes the data of a plurality of pages.

9. The image processing apparatus according to claim 1, further comprising:
a registration unit configured, if the image data used as the second image data has been edited, to register a content of the editing as an image editing setting together with the layout setting; and
a collation unit configured to collate the layout setting used for processing the first image data with the content of the image editing setting,
wherein if it is determined, as a result of the collation by the collation unit, that the layout setting does not match the content of the image editing setting, the layout setting used for the first image data is also used in processing the second image data.

10. An image processing apparatus control method comprising:
executing a layout setting on first image data;
determining an image type of second image data;
executing image processing, if it is determined, as a result of the determination, that the image type of the second image data is an image type for applying a layout setting set for the first image data on the second image data according to the layout setting set for the first image data, and not executing image processing, if it is determined, as a result of the determination, that the image type of the second image data is an image type for not applying a layout setting set for the first image data, on the second image data according to the layout setting set for the first image data; and
forming an image of the first image data that has been processed according to the set layout setting;
outputting the first image data on a printing sheet by using color toners;
forming an image of the second image data that has been image-processed; and
outputting the second image data on the printing sheet by using a transparent toner.

11. The image processing apparatus control method according to claim 10, further comprising:
obtaining a preprint sheet having the image of the first image data printed thereon according to the set layout; and
outputting print data for printing the second image data that has been image-processed according to the set layout setting on the preprint sheet.

12. The image processing apparatus control method according to claim 11, further comprising:
communicating with another image processing apparatus including receiving the second image data and the set layout setting; and
printing an image of the second image data, which has been processed according to the layout setting, on the preprint sheet.

13. The image processing apparatus control method according to claim 10, further comprising:
generating a display screen that allows a user to select whether to apply a result of the determination; and
applying, only if the user selects to apply the determination result, the layout setting in processing the second image data.

14. The image processing apparatus control method according to claim 10, further comprising designating, by the user, the image type of the second image data.

15. The image processing apparatus control method according to claim 10, further comprising:
displaying a list, if a plurality of pieces of first image data, which can be combined with the second image data, is input to the image processing apparatus, the list including at least one of a printing time of the first image data, a name of the user who has printed the first image data, a name of the first image data, a name of the second image data, and a preview of an image printed after the first image data and the second image data is combined.

16. The image processing apparatus control method according to claim 11, further comprising not receiving or accepting any print instruction for printing another image data after printing the first image data and until a timing of receiving an instruction for printing the second image data after the preprint sheet is fed.

17. The image processing apparatus control method according to claim 10, further comprising executing processing on the second image data, which includes the data of a plurality of pages, by using, if the second image data includes data of a plurality of pages, the layout setting used for the first image data.

18. The image processing apparatus control method according to claim 10, further comprising:
registering, if the image data used as the second image data has been edited, a content of the editing as an image editing setting together with the layout setting;
collating the layout setting used for processing the first image data with the content of the image editing setting; and
using, if it is determined, as a result of the collation, that the layout setting does not match the content of the image editing setting, the layout setting used for the first image data in processing the second image data.

19. A non-transitory computer-readable storage medium storing a computer-executable program including instructions which, when executed by an image processing apparatus, cause the image processing apparatus to perform operations comprising:
executing a layout setting on first image data;
determining an image type of second image data;
executing image processing, if it is determined, as a result of the determination, that the image type of the second image data is an image type for applying a layout setting set for the first image data on the second image data according to the layout setting set for the first image data, and not executing image processing, if it is determined, as a result of the determination, that the image type of the second image data is an image type for applying a layout setting set for the first image data, on the second image data not according to the layout setting set for the first image data; and
forming an image of the first image data that has been processed according to the set layout setting;
outputting the first image data on a printing sheet by using color toners;
forming an image of the second image data that has been image-processed; and
outputting the second image data on the printing sheet by using a transparent toner.

* * * * *